United States Patent
Ray et al.

(10) Patent No.: US 10,846,613 B2
(45) Date of Patent: Nov. 24, 2020

(54) SYSTEM AND METHOD FOR MEASURING AND PREDICTING CONTENT DISSEMINATION IN SOCIAL NETWORKS

(71) Applicant: Disney Enterprises, Inc., Burbank, CA (US)

(72) Inventors: Abhik Ray, Burbank, CA (US); Joel Branch, Burbank, CA (US); James Williams, Burbank, CA (US); Zvi Topol, Burbank, CA (US); Tasneem Brutch, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 874 days.

(21) Appl. No.: 15/394,094

(22) Filed: Dec. 29, 2016

(65) Prior Publication Data
US 2018/0189668 A1    Jul. 5, 2018

(51) Int. Cl.
G06N 20/00    (2019.01)
G06Q 50/00    (2012.01)
G06N 5/02     (2006.01)
G06N 20/20    (2019.01)

(52) U.S. Cl.
CPC .......... G06N 20/00 (2019.01); G06N 5/022 (2013.01); G06N 20/20 (2019.01); G06Q 50/01 (2013.01)

(58) Field of Classification Search
CPC ........ G06N 5/022; G06N 20/00; G06N 7/005; G06N 99/005; G06N 20/20; G06Q 50/01
USPC .......................................................... 706/12
See application file for complete search history.

(56) References Cited

U.S. PATENT DOCUMENTS

| | | | |
|---|---|---|---|
| 8,332,512 B1* | 12/2012 | Wu | G06Q 30/0254 705/319 |
| 9,749,431 B1* | 8/2017 | Cashmore | H04L 67/22 |
| 10,162,900 B1* | 12/2018 | Chatterjee | G06F 16/9535 |
| 2012/0036085 A1* | 2/2012 | Srivastava | G06Q 10/067 705/348 |
| 2012/0324007 A1 | 12/2012 | Werz, III et al. | |

(Continued)

FOREIGN PATENT DOCUMENTS

WO    2014159540 A1    10/2014

OTHER PUBLICATIONS

Lymperopoulos, Ilias N., "Predicting the popularity growth of online content: Model and algorithm" Jul. 18, 2016, Information Sciences 369, pp. 585-613. (Year: 2016).*

(Continued)

*Primary Examiner* — Miranda M Huang
*Assistant Examiner* — Chase P. Hinckley
(74) *Attorney, Agent, or Firm* — McCormick, Paulding & Huber PLLC

(57) ABSTRACT

Methods and systems for measuring and predicting content dissemination in social networks includes computing a "virality score" for popularity of social media content, a "pattern" of diffusion of the content, and a "hype" parameter of such content without requiring a "friendship graph" or "information diffusion" structured data. It also includes an iterative, predictive model, which predicts future performance (or future rate of dissemination) of the content while mitigating a class imbalance problem inherent in predicting viral posts, and which provides updates to the model based on actual performance results.

20 Claims, 19 Drawing Sheets

(56) References Cited

U.S. PATENT DOCUMENTS

| | | | |
|---|---|---|---|
| 2013/0041860 A1* | 2/2013 | Lawrence | G06Q 30/0201 706/46 |
| 2014/0156673 A1* | 6/2014 | Mehta | H04L 67/025 707/748 |
| 2014/0237093 A1 | 8/2014 | Hofman et al. | |
| 2014/0344281 A1 | 11/2014 | Rao et al. | |
| 2014/0358930 A1 | 12/2014 | Lerman et al. | |
| 2015/0019513 A1* | 1/2015 | Dey | G06Q 10/10 707/692 |
| 2015/0032675 A1* | 1/2015 | Huehn | G06Q 50/01 706/12 |
| 2015/0067849 A1* | 3/2015 | Agrawal | G06F 21/56 726/23 |
| 2015/0172145 A1* | 6/2015 | Skiba | H04L 67/10 709/224 |
| 2015/0220643 A1* | 8/2015 | Alba | G06F 16/9535 707/730 |
| 2016/0042284 A1* | 2/2016 | Menczer | G06Q 30/0202 706/46 |
| 2016/0353144 A1* | 12/2016 | Gopalan | H04N 21/252 |
| 2016/0359993 A1* | 12/2016 | Hendrickson | H04L 67/22 |
| 2017/0039305 A1* | 2/2017 | Shakarian | G06F 17/5009 |
| 2017/0206470 A1* | 7/2017 | Marculescu | H04L 51/32 |
| 2017/0277790 A1* | 9/2017 | Alonso | G06F 16/9535 |
| 2017/0323210 A1* | 11/2017 | Wang | H04L 67/02 |
| 2018/0158093 A1* | 6/2018 | Szirtes | G06N 5/022 |
| 2018/0181667 A1* | 6/2018 | Kolb | G06Q 50/01 |

OTHER PUBLICATIONS

Kolb et al., "System and Method to Model Recognition Statistics of Data Objects in a Business Database", Dec. 23, 2016, U.S. Appl. No. 62/438,787. (Year: 2016).*

Bezerianos et al., "GraphDice: A System for Exploring Multivariate Social Networks" 2010, Eurographics/IEEE-VGTC Symposium on Visualization, vol. 29, No. 3, pp. 863-872. (Year: 2010).*

Bauckhage et al., "Mathematical Models of Fads Explain the Temporal Dynamics of Internet Mennes" Jun. 28, 2013, Proceedings of the Seventh International AAAI Conference on Weblogs and Social Media, pp. 22-30. (Year: 2013).*

Junus et al., "Community-Aware Prediction of Virality Timing Using Big Data of Social Cascades" Mar. 30-Apr. 2, 2015, IEEE First International Conference on Big Data Computing Service and Applications, pp. 487-492. (Year: 2015).*

Sarabchi, Farhad, "Quantitative Prediction of Twitter Message Dissemination: A Machine Learning Approach", 2015, Delft University, pp. i-74. (Year: 2015).*

Sharif et al., "A Classification Based Framework to Predict Viral Threads" 2015 Pacific Asia Conference on Information Systems. (Year: 2015).*

Hu et al., "Predicting the popularity of viral topics based on time series forecasting" Jun. 9, 2016, Neurocomputing, No. 210, pp. 55-65. (Year: 2016).*

Kilanioti et al., "Efficient Content Delivery through Popularity Forecasting on Social Media" Jul. 13-15, 2016, 7th International Conference on Information, Intelligence, Systems, & Applications. (Year: 2016).*

Hassan et al., "Twitter Sentiment Analysis: A Bootstrap Ensemble Framework" Sep. 8-14, 2013, International Conference on Social Computing, pp. 357-364. (Year: 2013).*

Deza et al., "Understanding Image Virality" Jun. 7-12, 2015, IEEE Conference on Computer Vision and Pattern Recognition, pp. 1818-1826. (Year: 2015).*

Jheng et al., "Popularity Prediction of Social Multimedia Based on Concept Drift" Sep. 8-14, 2013, International Conference on Social Computing, pp. 821-826. (Year: 2013).*

Mishra et al., "Feature Driven and Point Process Approaches for Popularity Prediction" Oct. 24-28, 2016, pp. 1069-1078. (Year: 2016).*

Jin et al., "News Credibility Evaluation on Microblog with a Hierarchical Propagation Model" 2014, IEEE International Conference on Data Mining, pp. 230-239. (Year: 2014).*

Hodges, James S., "Richly Parameterized Linear Models: Additive, Time Series, and Spatial Models Using Random Effects" 2014, Texts in Statistical Science, pp. i-425. (Year: 2014).*

Silva et al., "Tweet sentiment analysis with classifier ensembles" Jul. 24, 2014, Decision Support Systems, No. 66, pp. 170-179. (Year: 2014).*

Wu et al., "Analyzing and predicting news popularity on Twitter" Jul. 21, 2015, International Journal of Information Management, No. 35, pp. 702-711. (Year: 2015).*

Shulman et al., "Predictability of Popularity: Gaps between Prediction and Understanding" Mar. 31, 2016, Association for the Advancement of Artificial Intelligence. (Year: 2016).*

Li et al., "On Popularity Prediction of Videos Shared in Online Social Networks" Oct. 27-Nov. 1, 2013, pp. 169-178. (Year: 2013).*

Li et al., "The Roles of Network Communities in Social Information Diffusion" 2015 IEEE International Conference on Big Data, pp. 391-400. (Year: 2015).*

Krishnan et al., "Seeing the Forest for the Trees: New Approaches to Forecasting Cascades" May 22-25, 2016, pp. 249-258. Year: 2016).*

Kanakaraj et al., "Performance Analysis of Ensemble Methods on Twitter Sentiment Analysis using NLP Techniques" Feb. 7-9, 2015, Proceedings of the 2015 IEEE 9th International Conference on Semantic Computing, pp. 169-170. (Year: 2015).*

Kafeza et al., "Predicting Information Diffusion Patterns in Twitter" 2014, International Federation for Information Processing, pp. 79-89. (Year: 2014).*

Hoang et al., "Tracking Virality and Susceptibility in Social Media" Oct. 24-28, 2016, pp. 1059-1068. (Year: 2016).*

Hashem et al., "Data Modeling and Case-based Reasoning for Social Monitoring" Aug. 22-24, 2016, IEEE 4th International Conference on Future Internet of Things and Cloud Workshops, pp. 194-199. (Year: 2016).*

Elsharkawy et al., "Towards Feature Selection for Cascade Growth Prediction on Twitter" May 9-11, 2016, pp. 166-172. (Year: 2016).*

Cheung et al., "Predicting Content Virality in Social Cascade" 2013 IEEE International Conference on Green Computing and Communications, pp. 970-975. (Year: 2013).*

Xie et al., "Modelling Cascades Over Time in Microblogs" Oct. 29-Nov. 1, 2015, IEEE International Conference on Big Data, pp. 677-686. (Year: 2015).*

Bauckhage et al., "Strong Regularities in Growth and Decline of Popularity of Social Media Services" Jun. 25, 2014. (Year: 2014).*

France et al., "Characterizing viral videos: Methodology and applications" Jul. 26, 2016, Electronic Commerce Research and Applications, No. 19, pp. 19-32. (Year: 2016).*

Figueiredo et al., "On the Dynamics of Social Media Popularity: A Youtube Case Study" Dec. 2014, ACM Transactions on Internet Technology, vol. 14, No. 4, Art. 24, pp. 1-23. (Year: 2014).*

Asur et al., "Predicting the Future with Social Media" 2010 IEEE/ WIC/ACM International Conference on Web Intelligence and Intelligent Agent Technology, pp. 492-499. (Year: 2010).*

Wu et al., "Unfolding Temporal Dynamics: Predicting Social Media Popularity Using Multi-Scale Temporal Decomposition" Feb. 21, 2016, Proceedings of the Thirtieth AAAI Conference on Artificial Intelligence, pp. 272-278. (Year: 2016).*

Yu et al., "The Lifecycle of a Youtube Video: Phases, Content, and Popularity" Apr. 21, 2015, Proceedings of the Ninth International AAAI Conference on Web and Social Media, pp. 533-542. (Year: 2015).*

Junus et al., "Community-Aware Prediction of Virality Timing Using Big Data of Social Cascades" 2015, IEEE First International Conference on Big Data Computing Service and Applications, pp. 487-492. (Year: 2015).*

Zheng et al., "Capturing the essence of word-of-mouth for social commerce: Assessing the quality of online e-commerce reviews by a semi-supervised approach" Jun. 15, 2013, Decision Support Systems, No. 56, pp. 211-222. (Year: 2013).*

(56) References Cited

OTHER PUBLICATIONS

Watts et al., "Tweet Sentiment as Proxy for Political Campaign Momentum" Dec. 5-8, 2016, IEEE International Conference on Big Data, pp. 2475-2484. (Year: 2016).*
Richier et al., "Predicting Popularity Dynamics of Online Contents Using Data Filtering Methods" Sep. 27-30, 2016, 54th Annual Allerton Conference, pp. 31-38. (Year: 2016).*
Srivastava et al., "Ensemble Methods for Sentiment Analysis of On-line Micro-Texts" Dec. 23-25, 2016, IEEE International Conference on Recent Advances and Innovations in Engineering. (Year: 2016).*
Cheung et al., "Predicting Content Virality in a Social Cascade" 2013, IEEE International Conference on Green Computing and Communications and IEEE Internet of Things and IEEE Cyber, Physical, and Social Computing, pp. 970-975. (Year: 2013).*
Zhao, Jianqiang, "Combining Semantic and Prior Polarity Features for Boosting Twitter Sentiment Analysis using Ensemble Learning" Jun. 13-16, 2016, IEEE First International Conference on Data Science in Cyberspace, pp. 709-714. (Year: 2016).*
Jheng et al., "Popularity Prediction of Social Multimedia based on Concept Drift" 2013, IEEE, pp. 821-826. (Year: 2013).*
Shi et al., "Learning-to-Rank for Real-Time High-Precision Hashtag Recommendation for Streaming News" Apr. 11, 2016, Proceedings of the 25th International Conference on World Wide Web, pp. 1191-1202. (Year: 2016).*
Cheng et al., "Can Cascades be Predicted?" Apr. 7-11, 2014, pp. 925-935. (Year: 2014).*
Felipe da Silva et al., "Using unsupervised information to improve semi-supervised tweet sentiment classification" Feb. 17, 2016, Information Sciences, No. 355, pp. 348-365. (Year: 2016).*
Han et al., "Predicting the topic influence trends in social media with multiple models" Jun. 19, 2014, Neurocomputing, No. 144, pp. 463-470. (Year: 2014).*
Troussas et al., "Evaluation of Ensemble-based Sentiment Classifiers for Twitter Data" Jul. 13-15, 2016, 7th International Conference on Information, Intelligence, Systems & Applications. (Year: 2016).*
Pinto, Julio Cesar Louzada, "Information diffusion and opinion dynamics in social networks" Feb. 3, 2016, Doctoral Dissertation, Institut National des Telecommunications (Paris), pp. i-199. (Year: 2016).*
Zamora, Joel Barajas, "Online Display Advertising Causal Attribution and Evaluation" Sep. 2015, Doctoral Dissertation, University of California Santa Cruz, pp. i-162. (Year: 2015).*
Wang, Wenjun, "Modeling influence diffusion in networks for community detection, resilience analysis and viral marketing" Summer 2016, Doctoral Dissertation, University of Iowa, pp. i-163. (Year: 2016).*
Guo et al., "Toward Early and Order-of-Magnitude Cascade Prediction in Social Networks" Aug. 8, 2016, pp. 1-27. (Year: 2016).*
Argaiz, Jose Luis Iribarren, "The Dynamics of Viral Information Diffusion in Online Social Networks" Feb. 28, 2015, pp. i-222. (Year: 2015).*
Karimi et al., "Smart Broadcasting: Do You Want to be Seen?" Aug. 13-17, 2016, pp. 1635-1644. (Year: 2016).*
Rizoiu et al., "Can this video be promoted?—Endogenous and exogenous popularity processes in social media" Feb. 19, 2016, pp. 1-8. (Year: 2016).*
Rizoiu et al., "Expecting to be HIP: Hawkes Intensity Processes for Social Media Popularity" Dec. 21, 2016, pp. 1-18. (Year: 2016).*
Gao et al., "Modeling and Predicting Retweeting Dynamics on Microblogging Platforms" Feb. 2-6, 2015, pp. 107-116. (Year: 2015).*
Kobayashi et al., "TiDeH: Time-Dependent Hawkes Process for Predicting Retweet Dynamics" Mar. 2016, Proceedings of the Tenth International AAAI Conference on Web and Social Media, pp. 191-200. (Year: 2016).*
Kumar et al., "An Empirical Evaluation of Social Influence Metrics" Jul. 23, 2016. (Year: 2016).*
Shafiq et Liu, "Modeling Morphology of Social Network Cascades" Feb. 10, 2013. (Year: 2013).*
Ye et al., "Collective Attention and the Dynamics of Group Deals" Nov. 29, 2011. (Year: 2011).*
Rotabi et Kleinberg, "The Status Gradient of Trends in Social Media" Mar. 10, 2016. (Year: 2016).*
Petrovic, Sasa; Osborne, Miles; Lavrenko, Victor, "RT to Win! Predicting Message Propagation in Twitter", United Kingdom.
Kupavskii, Audrey; Umnov, Alexey; Gusev, Gleb; Serdyukov, "Predicting the Audience Size of a Tweet", pp. 693-696, Russia.
Cheng, Justin; Adamic, Lada A.; Dow, P. Alex; Kelinberg, Jon; Leskovec, Jure, "Can Cascades be Predicted?", Republic of Korea.
Richier, Cedric; Altman, Eitan, Elazouzi, Rachid, Altman, Tania; Linares, Georges; Portilla, Yonathan, "Modelling View—Count Dynamics in YouTube", Cornell University Library, pp. 1-10, arxiv.org/abs/1404.2570.

* cited by examiner

| Time (min) | # of "Shares" Data ("X") | Exponential Un-bounded Fit | Exponential Bounded Fit | Logistic Fit | Linear Fit |
|---|---|---|---|---|---|
| 10 | 200 | 51 | 51 | 150 | 400 |
| 20 | 350 | 201 | 201 | 200 | 700 |
| 30 | 480 | 451 | 451 | 300 | 1000 |
| 40 | 400 | 801 | 801 | 400 | 1300 |
| 50 | 1400 | 1251 | 1251 | 800 | 1600 |
| 60 | 2200 | 1801 | 1751 | 3300 | 1900 |
| 70 | 2800 | 2451 | 2300 | 3800 | 2200 |
| 80 | 2900 | 3201 | 3000 | 3900 | 2500 |
| 90 | 3900 | 4051 | 3500 | 4000 | 2800 |
| 100 | 4200 | 5001 | 3600 | 4000 | 3100 |

Virality Stats Logic

Fig. 6
Virality Stats Table

| Post ID | Page "Shares" Time Series (Elapsed Time:Total #Shares) | Date/Time of Post | Current Date/Time | Current Best Fit Curve | Curve Fit Parameters | Current Virality Score | Current Hype-Lifetime (Th)(hrs) | Current # Shares @ Hype-Lifetime K/2 | Current Hype-Lifetime % | Ex-Post Time (Txp) |
|---|---|---|---|---|---|---|---|---|---|---|
| P1-1 | 10min:200shares; 20min:350shares; 30min:480shares; 40min:600shares; *** 100min:4200shares; *** 10hours:10,500shares | 9/1/16; 11:00 am | 9/1/16; 9:00 pm | Logistic (V) | $K, B_0, B_1$ | 45 | 3.0 | 5,000 | 30% | 10 hrs |
| P1-2 | 10min:100shares; 20min:250shares; 30min:380shares; 40min:420shares; *** 100min:1200shares; *** 7hours:7,500shares | 9/1/16; 2:00 pm | 9/1/16; 9:00 pm | Linear (NV) | $M, B$ | 30 | 3.8 | 2,200 | 54.3% | 7 hrs |
| P1-3 | 10min:50shares; 20min:350shares; 30min:780shares; 40min:1000shares; *** 100min:4200shares; *** 4hours:15,500shares | 9/1/16; 5:00 pm | 9/1/16; 9:00 pm | Exp. Bounded (V) | $A, B$ | 80 | 2.5 | 7,500 | 62.5% | 4 hrs |
| P1-4 | 10min:200shares; 20min:350shares; 30min:480shares; 40min:400shares; 50min:1400shares; 60min:2200shares; *** 120min:4200shares | 9/1/16; 7:00 pm | 9/1/16; 9:00 pm | Exp. Unbounded (V) | $A, B, C$ | 50 | 1.5 | 2,500 | 75% | 2 hrs |
| *** | | | | | | | | | | |

Account1: SportsNewsFacebook

Total Sample Lifetime ("Total Shares" Lifetime) = 24 hrs

Fig. 7

Virality Stats Tables (Multiple Accounts)

| [Accnt 1] Post ID | Time Series (Elapsed time:Total #Shares) | Date/Time of Post | Current Date/Time | Current Best Fit Curve | Curve Fit Parameters | Virality Score | Hype-Lifetime (Th)(hrs) | # Shares @ Hype-Lifetime | Hype-Lifetime % |
|---|---|---|---|---|---|---|---|---|---|
| P1-1 | 10min:200shares; *** 10hours:10,500shares | 9/1/16; 11:00 am | 9/1/16; 9:00 pm | Logistic | $K, B_0, B_1$ | 45 | 3.0 | 5,000 | 30% |
| P1-2 | 10min:100shares *** 7hours:7,500shares | 9/1/16; 2:00 pm | 9/1/16; 9:00 pm | Linear | $M, B$ | 30 | 3.8 | 2,200 | 54.3% |
| P1-3 | 10min:50shares; *** 4hours:15,500shares | 9/1/16; 5:00 pm | 9/1/16; 9:00 pm | Exp. Bounded | $A, B$ | 80 | 2.5 | 7,500 | 62.5% |
| P1-4 | 10min:200shares; *** 120min:4200shares | 9/1/16; 7:00 pm | 9/1/16; 9:00 pm | Exp. Un-bounded | $A, B, C$ | 50 | 1.5 | 2,500 | 75% |
| *** | | | | | | | | | |

(Stacked behind: [Accnt 2] Post ID: P2-1, P2-2, P2-3, P2-4, *; [Accnt 3] Post ID: P3-1, P3-2, P3-3, P3-4, *; [Accnt N] Post ID: PN-1, PN-2, PN-3, PN-4, ***)

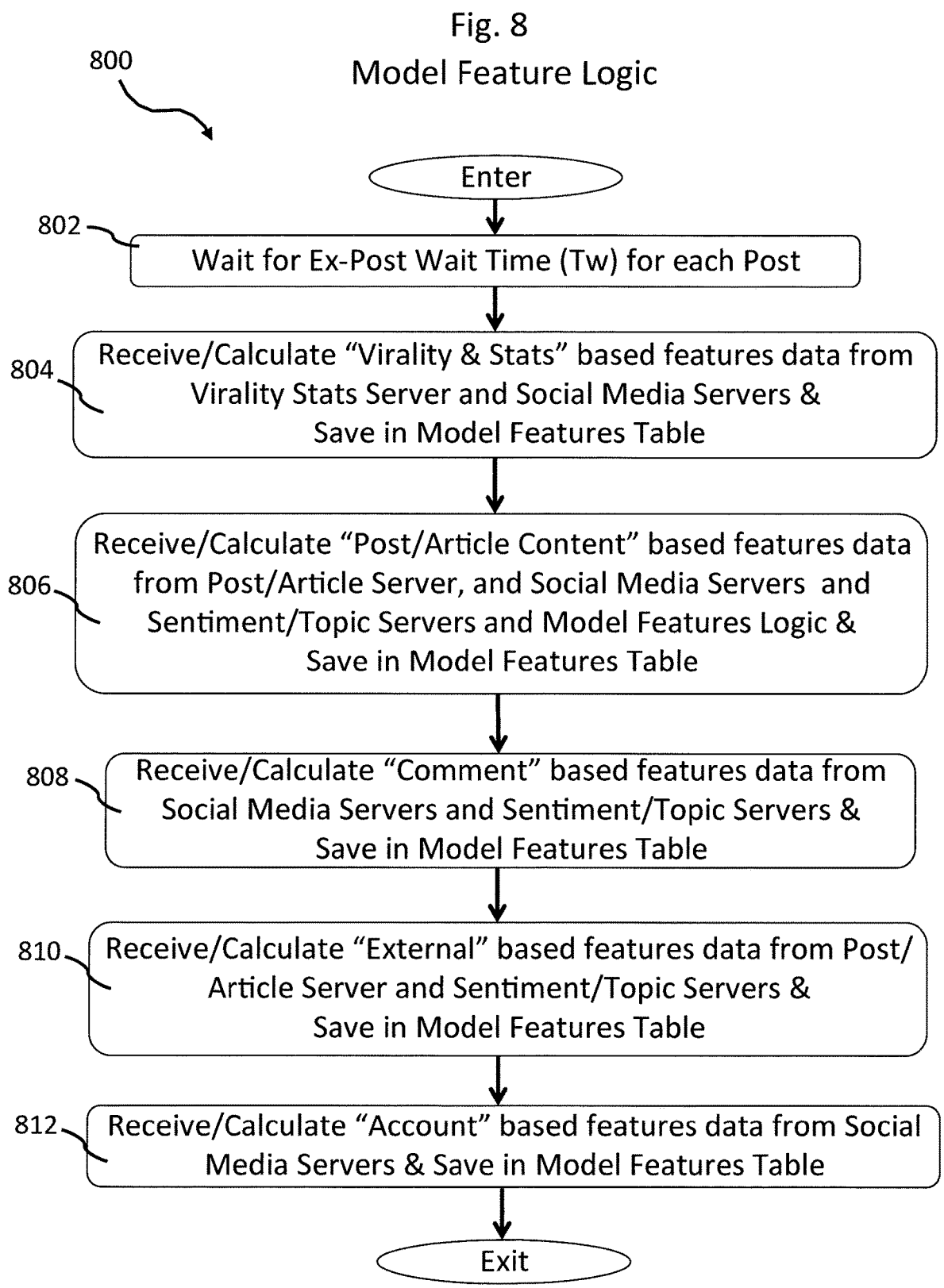

Fig. 9

| MODEL FEATURES (per post) | Source | P1-1 | *** P1-n |
|---|---|---|---|
| "Virality & Statistics" based | | | |
| Virality score at end of ex-post Wait Time (1 hr) | VSS | 58 | |
| HLP (or $T_h$ or K/2) at end of ex-post Wait Time (1 hr) | VSS | 30% | |
| Total # Likes on Post/Article at end of ex-post Wait Time (1 hr) | SMS | 5000 | |
| Total # Comments on Post/Article at end of ex-post Wait Time (1hr) | SMS | 1500 | |
| Total # Shares of Post/Article at end of ex-post Wait Time (1 hr) | VSS | 2000 | |
| Date/Time of Post | VSS | 9/1/16 11am | |
| "Post/Article Content" based | | | |
| Length of post/article (# of words per sentence) | PAS/SMS | 8/200 | |
| # Named Entities used in post/article | PAS/SMS | 2 | |
| Sentiment of Post (positive, negative, neutral) | STS | Pos. | |
| Diversity/Generality of Topics of Post ("topic separation") (1-10) | STS | 5 | |
| Topic similarity with last few Posts (1-10) | STS | 8 | |
| Type of Article content (Text, Image, Video, Hybrid) | MFL | H | |
| # Images in Article content | MFL | 2 | |
| "Comment" based | | | |
| # of Commenters to Post/Article ("first level") | SMS | 100 | |
| Single Comment with the most "Likes" (CML) | SMS | C-100 | |
| # "Likes" on the single Comment with most Likes (L-Max) | SMS | 500 | |
| # Replies on most "Liked" single Comment (R-L-Max) | SMS | 150 | |
| Single Comment with the most "Replies" (CMR) | SMS | C-230 | |
| # "Replies" to single Comment with most Replies (R-Max) | SMS | 350 | |
| # Likes on most Replied-to single Comment (L-R-Max) | SMS | 250 | |
| Sentiment on Replies to single Comment with most Likes (S-R-L-Max) | STS | Pos. | |
| Sentiment on Replies to single Comment with the most Replies (S-R-Max) | STS | Neut. | |
| "External" based | | | |
| % of top 5 trending Topics included in Post/Article | PAS/STS | 20% | |
| "Account" based | | | |
| # of "Followers" on Account | SMS | 20K | |

Fig. 13
Virality Prediction Table

| Account1 | | Predicted "Shares" Growth Factor | | | | | | |
|---|---|---|---|---|---|---|---|---|
| Post ID | Double (2x) | Triple (3x) | Quad (4x) | 5x | 6x | *** | SGR | AVC |
| P1-1 | Y | Y | N | | | | 2x-3x | N |
| P1-2 | Y | Y | Y | N | | | 3x-4x | N |
| P1-3 | Y | N | Y | Y | | | 1x-2x | N |
| P1-4 | Y | Y | Y | Y | N | | 4x-5x | N |
| P1-5 | N | | | | | | 1x | N |
| P1-6 | | | | | | | N/A | Y |
| *** | | | | | | | | |

Prediction Time (Tp): 6.0 Hours    Prediction Wait (Tw): 1.0 Hours

Prediction Model Update Logic

Display Logic

SYSTEM AND METHOD FOR MEASURING AND PREDICTING CONTENT DISSEMINATION IN SOCIAL NETWORKS

BACKGROUND

It is common for media companies and other entities to use social networks, e.g., such as Facebook®, Twitter®, Google+® (or Google Plus), Snapchat®, and the like, to publish (or "post") content that is of interest to their viewing or listening audience (or the public in general). To achieve this objective, the media companies desire to measure or predict the amount (or degree) of content dissemination reflective of audience engagement for such published content.

One challenge is that predictive techniques that rely on structural features typically require access to "friendship graphs" of social network members, which shows, e.g., for a given member, which other members are connected to the given member. Friendship graphs are useful because the structure of such graphs can provide visibility into different patterns and rates of content dissemination among members. However, social networks do not typically expose these data for privacy reasons making it very difficult for media companies and third parties (vendors, and the like) to create and evaluate metrics on how content is disseminating.

Accordingly, it would be desirable to have a method and system that can measure and predict the dissemination of content in social networks.

BRIEF DESCRIPTION OF THE DRAWINGS

FIG. 6 is a table showing a share data time series, certain attributes, and virality statistics data, in accordance with embodiments of the present disclosure.

FIG. 7 is a table showing the data of FIG. 6 for a plurality of social media accounts, in accordance with embodiments of the present disclosure.

FIG. 8 is a flow diagram of another one of the components of FIG. 2, in accordance with embodiments of the present disclosure.

FIG. 9 is a table showing various model features for a plurality of posts, in accordance with embodiments of the present disclosure.

FIG. 13 is a table showing the results of predictive modeling for a plurality of posts, in accordance with embodiments of the present disclosure.

DETAILED DESCRIPTION

Figure 1:
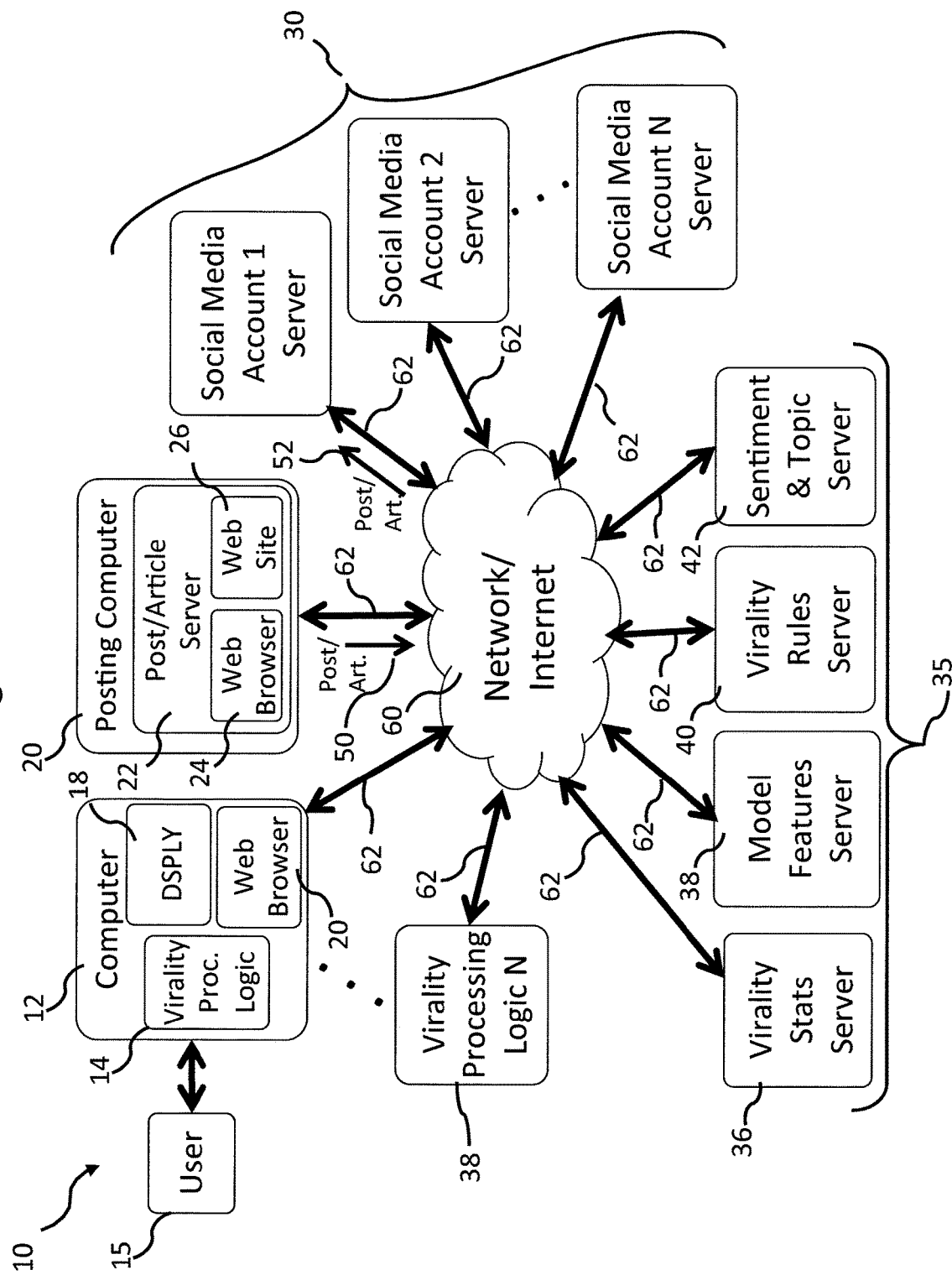
FIG. 1 is a top-level block diagram of components of a system and method for measuring and predicting content dissemination in social networks, in accordance with embodiments of the present disclosure.

As discussed in more detail below, the present disclosure is directed to methods and systems for measuring and predicting, in real-time, the dissemination of content in social networks without requiring or having to infer or re-create a "friendship graph" or "information diffusion" data structure, or the like. More specifically, methods and systems of the present disclosure (collectively referred to herein as "the present disclosure") measure and predict, in real-time, the dissemination of content in social media networks by creating metrics indicative of rate and structure of the dissemination, without having to infer or re-create a friendship graph structure, thus providing real-time monitoring and scoring of content dissemination. This significantly increases the real-time throughput capability and feasibility of the predictive process.

In general, content dissemination online may be described in two basic forms, "deep and narrow" and "broad and shallow". We define "deep and narrow" dissemination, as a "viral" model, and may be characterized as a smaller proportion of people receiving (or consuming) content directly from a media network, e.g., a sports media network such as ESPN.com, and the remaining larger proportion of people receiving the content through "shares" from the initial smaller proportion. "Broad and shallow" dissemination, may also be called a "broadcast" (or "non-viral") model, and may be characterized as most of the content being received (or consumed) directly by followers of the media network (e.g., ESPN.com). According to the present disclosure, dissemination metrics are computed without requiring any knowledge of the social media network structure or relationships, providing a continuously sampled (or monitored) and continuously updated (i.e., real-time) determination of the viral (and non-viral) metrics for each post as the post share statistics change.

In addition, the present disclosure identifies or calculates "features" (or feature sets or rules or feature vectors or feature data) for use in an adaptive predictive model for predicting content dissemination. Further, the present disclosure addresses a "class-imbalance" problem, that can exist when predictive models are dealing with large shifts in the distribution of data, such as in a viral post dissemination, to provide accurate predictive models that can accurately and reliably predict the future social network audience engagement on disseminated content. Hence, feature data are used to train classifiers, such as logistic regression, support vector machines (SVM), neural networks, decision tree classifiers, used to predict the virality of content dissemination.

The systems and methods of the present disclosure may also provide Graphic User Interface (GUI) showing the level and type of dissemination (or content distribution patterns and rates), as well as a prediction of the degree to which the content will spread.

The systems and methods of the present disclosure may be used for "descriptive" analytics to monitor virality of existing content with the aim of managing content placement in a social media feed or on a website. Also, determining, after the post ("ex-post"), the effectiveness of the presentation of content, when there are multiple variations or forms possible for a piece of content. For example, a user or social media editor (or content creator) might want to try out different synonyms for a word on a post and measure the effectiveness of the synonyms in capturing audience attention.

The present disclosure may also be used for "predictive" analytics, such as helping content editors (or creators) select better textual features, e.g., wording, sentence structure, entity mentions, and the like, for textual content, to increase the predicted (and actual) virality of the content.

In addition, because social media posts may have advertising content embedded in or linked to the post, understanding the level of dissemination of a post (as described in the present disclosure) can also help content providers determine the value or price to charge an advertiser to place an advertisement in or linked to a post.

For example, the present disclosure may be used to analyze content posted by a sports media network (or other media distribution outlet) on their Facebook (or other social media) web page, such as "Team ABC is going to the baseball world series!," and determine how widely it will be disseminated and for how long and predict how long it will be viral. It may also provide a visualization of same.

The visualization or GUI may also provide the user with the ability to view details about the virality statistics (or stats) of each social media post, such as a "virality score", a "hype-lifetime", and a predicted "growth rate", as will be explained in detail below. A user may also select or adjust how they view the virality visualization in the GUI (e.g., the format of the display) and a time window for ex-post data collection and analysis, where maximum ex-post time denotes the lifetime or total lifetime sample window of the "data shares".

FIG. 1 illustrates various components (or devices or logic) of an embodiment of a system 10 for measuring and predicting popular content in social media networks of the present disclosure, which includes a user computer 12, a posting computer 20, one or more social media account servers 30, and various other servers 35 that interact with the user computer 12 to perform the functions described herein.

The user computer 12, the posting computer 20, the social media account servers 30, and various other servers 35 (such as a virality stats server 36, model features server 38, virality rules server 40, and sentiment/topic server 42) may each be connected to or communicate with each other through a communication network 60, such as a local area network (LAN), wide area network (WAN), virtual private network (VPN), peer-to-peer network, or the internet, by wired or wireless transmission links, as indicated by lines 62, by sending and receiving digital data over the communications network 60.

The user computer 12 has Virality Processing Logic 14 running thereon which provides various functions as discussed herein, including measuring, predicting and displaying data relating to the dissemination of content in social networks, as discussed further herein. The user computer 12 also has a web browser 16 and interfaces with a display 18 to provide a GUI described more hereinafter. The computer 12 may also interact with a user 15, which views the GUI on the display and may provide user information or settings for the Virality Processing Logic 14. The user 15 may interact with the computer 12 using the display 18 (or other input devices/accessories such as a keyboard, mouse, or the like) and may provide input data to the computer 12 to control certain aspects of the operation of the logic 14 running on the computer 12 (as discussed further herein). The user 15 may be a social media content editor or creator or a social media advertising pricing manager or any other user that may be able to use the information and data provided herein. The display 18 also interacts with the local operating system on the computer 12 and any hardware or software applications, video and audio drivers, interfaces and the like, needed to view the visualizations or other output data and display the appropriate GUI for the logic 14 as described herein.

In some embodiments, the system 10 may also include additional virality processing logics 38, which may communicate with the virality processing logic 14 and provide additional or parallel processing capability for the virality processing logic 14, as discussed hereinafter.

The posting computer 20 may have a post/article 22 server, running on the posting computer 20, which posts content (as indicated by a line 50) using a web browser 24 (or web server or equivalent interface), via the communications network 60, to the social media servers 30 (as indicated by a line 52). The posting computer 20 may also support a website 26, e.g., such as a sports media website, and the posting computer 20 may post content directly to the website 26 for viewing by others, such as the general public or "followers" of the sports media site. After the post 50 has been received and displayed (or "posted") by the social media sites, the Virality Processing logic 14 monitors the social media sites/servers 30 and the media web sites 26 to measure and predict, in real-time, the response and dissemination of the post/article, as discussed more hereinafter. Any other data storage arrangement for the servers and the like that performs the functions of the present disclosure may be used if desired.

Figure 2:
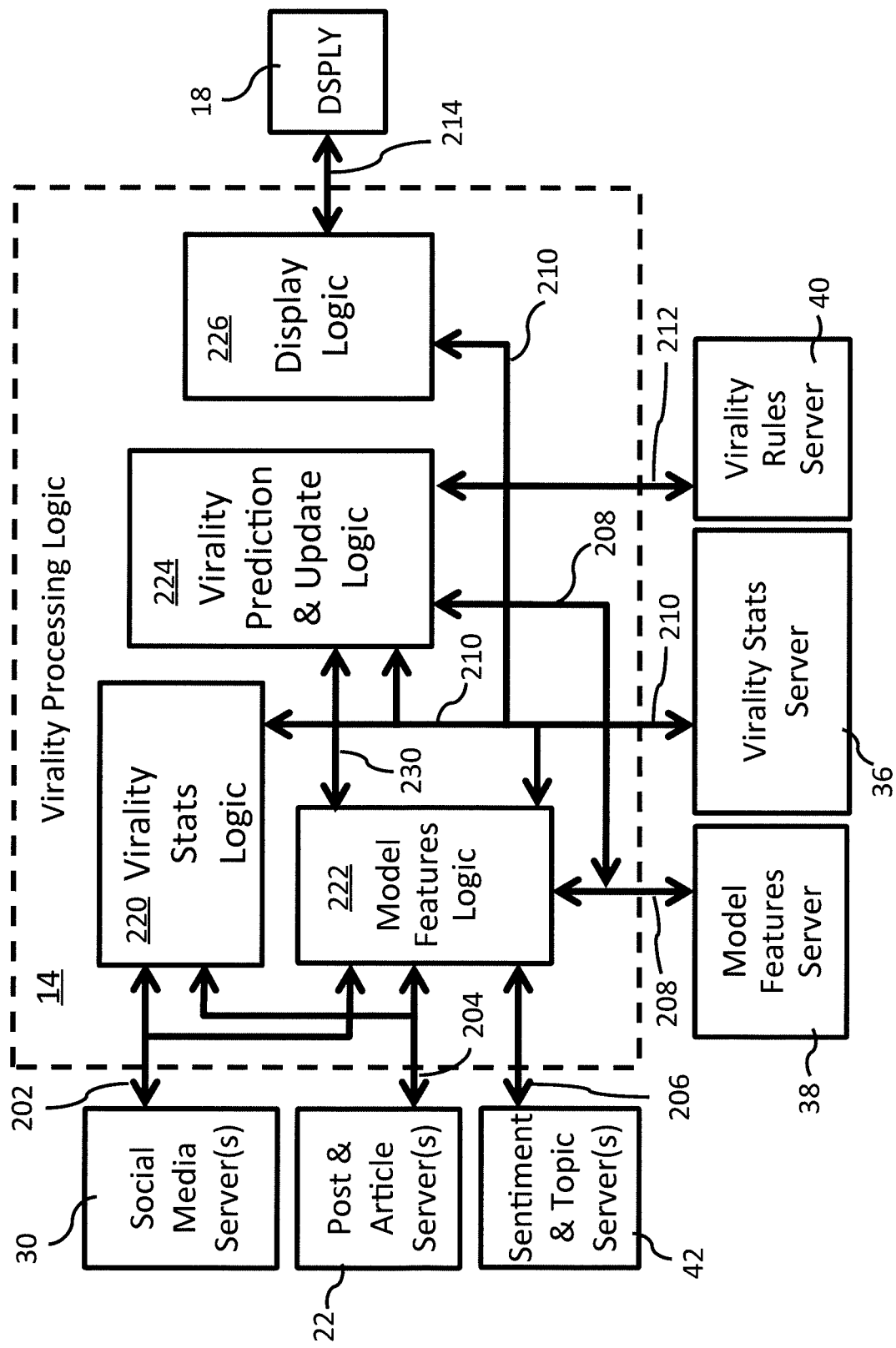
FIG. 2 is a more detailed block diagram of components of FIG. 1, in accordance with embodiments of the present disclosure.

Referring to FIG. 2, the Virality Processing logic 14, receives input data on a line 202 from one or more of the Social Media Server(s) 30 (FIG. 1), which provides "shares" data relating to each post (or article or generally "content") over time, such as: shares, Facebook "likes", re-tweets, comments, favorites, bookmarks, or any other action indicative of dissemination of the post/article/content, for each social media account associated with various social media platforms, e.g., Facebook, Twitter, Snapchat, Google+, or any other social media platform or network. The social media server(s) 30 typically update or "ingest" the shares data from the corresponding social media web sites/services/accounts at a predetermined rate, e.g., once every 10 minutes. Other update rates may be used if desired, which may depend on the update rates available from a given social media service or account provider, and the desired sample rate for shares data used by the logic described herein, or other factors.

The Virality Processing logic 14 also receives input data from Post/Article Servers 22 (FIG. 1) on a line 204. The logic 14 also receives and provides data to a Model Features Server 38 on a line 208, a Virality Stats Server 36 on a line 210, and a Virality Rules Server 40 on a line 212. In addition, the logic 14 provides GUI data to the display 18 on a line 214.

More specifically, in some embodiments, the Virality Processing logic 14, may be viewed as having four primary components: Virality Stats Logic 220, Virality Prediction & Update Logic 224, Model Features Logic 222, and Display Logic 226. The Virality Stats Logic 220 receives or retrieves input data (e.g., "shares" data) from the social media server(s) 30 and measures data relating to the dissemination of content in social networks and saves them in the Virality Stats server 36 for use by other components or logics of the Virality Processing Logic 14.

The Model Features Logic 222 calculates or retrieves various parameters or "features" data and saves them in the Model Features Server 38 for use by predictive models in the Virality Prediction & Update Logic 224. The Virality Prediction & Update Logic 224 receives input data from the Model Features Logic 222 on a line 230, the Model Features Server 38 on the line 208, the Virality Stats Server 36 on the line 210 and the Virality Rules Server 40 on the line 212, which is used to predict the expected growth of posted content, as discussed further herein. The Display Logic 226 receives data from the Virality Stats Server 36 on the line 210 and provides GUI (or visualization) data, on the line 214 to display (or visualize) the virality and prediction measurements, to the display 18, as discussed further herein.

Figure 3:
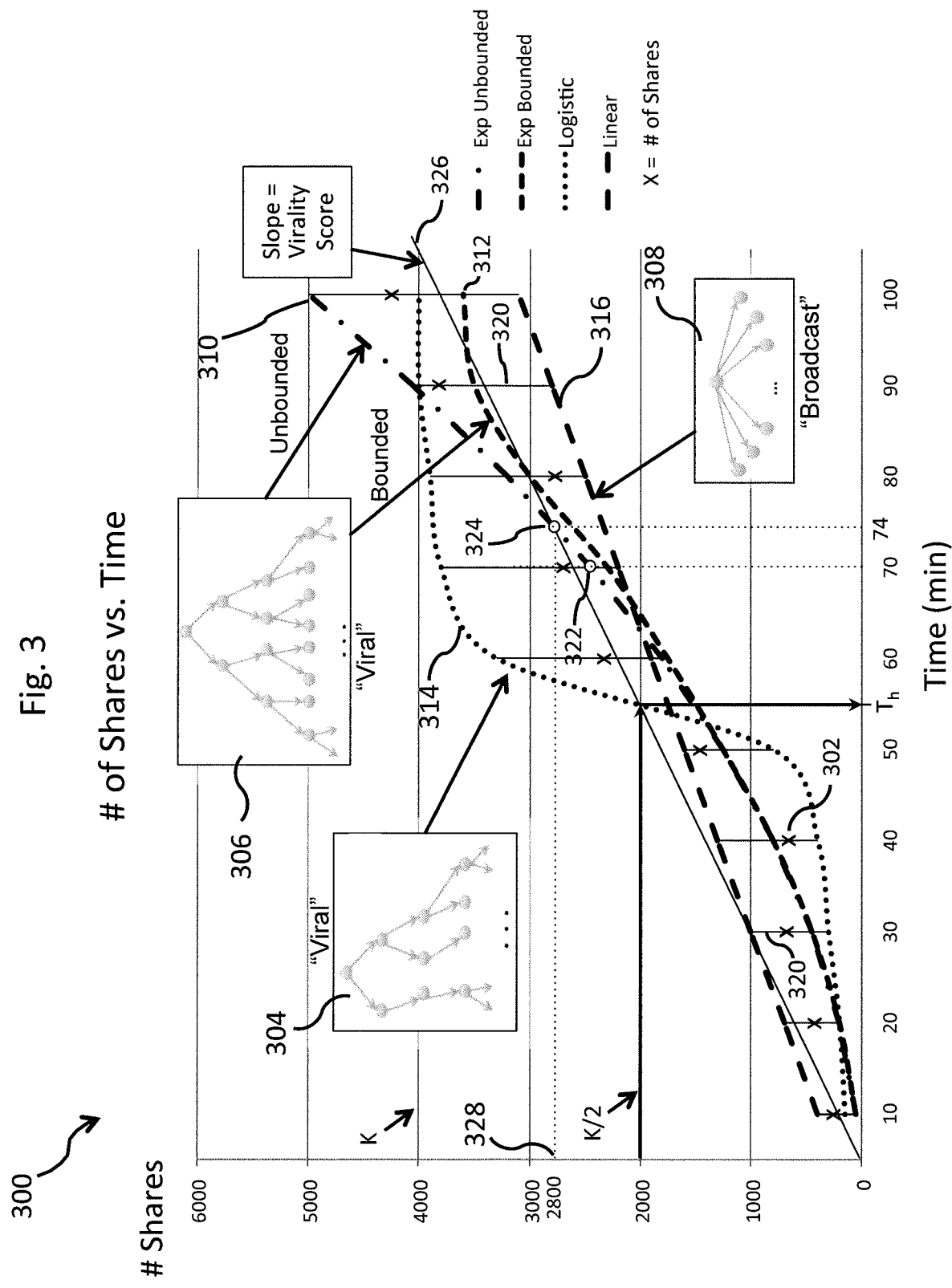
FIG. 3 is a graph of number of shares vs. time, showing a family of curves for curve-fitting options, and an example of shares data, in accordance with embodiments of the present disclosure.
Figure 4:
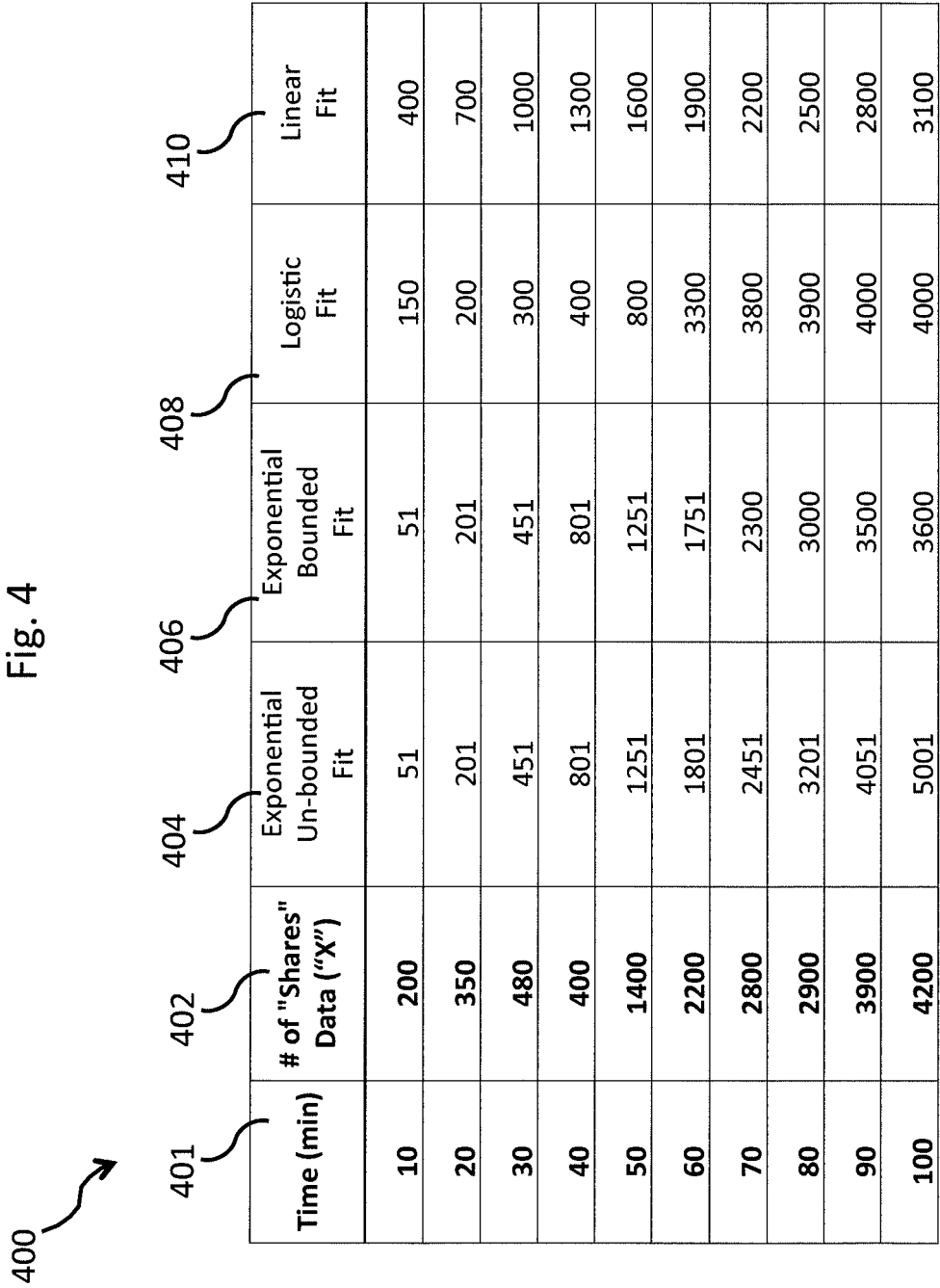
FIG. 4 is a table showing data values for the example of shares data and curve fitting options shown in the graph of FIG. 3, in accordance with embodiments of the present disclosure.

Referring to FIGS. 3 and 4, a graph 300 of number of "shares" vs. time, shows "shares" data 302, indicated by an "X" on the graph 300, of how a social media post may be "shared" over time (e.g., "share" data or statistics or stats).

Examples of the "viral" spreading models are shown by tree diagrams 304, 306, and an example of the "broadcast" spreading model is shown by tree diagram 308. We have found that "viral" spreading of content online has a dissemination growth curve that is very similar to certain exponential growth curves or to a logistic growth curve. In particular, we have found that for early stage viral growth, the share growth curve may resemble an unbounded exponential growth curve 310, while for later stage viral growth, the growth curve may resemble a bounded exponential growth curve 312, or a logistic growth curve 314. We have also found that "broadcast" or "non-viral" spreading has a dissemination growth curve that is substantially linear in nature as shown by a line 316.

The present disclosure tracks a post on social media (or "social post") over its measured lifetime (or "total shares" lifetime) and continuously fits (in real-time) the current share data into exemplary four (4) growth curves, e.g., linear, exponential, exponential bounded and logistic. The results of these curve fits provides data used to generate dissemination data, as described more below.

More specifically, referring to FIGS. 3 and 4, the shares data 302 (shown as points labeled "X" on the graph 300) are used to fit each one of the following four curves to: 310 (exponential), 312 (exponential bounded), 314 (logistic), and 316 (linear). Also, a table 400 (FIG. 4), having columns 401-410, shows example values of the number of shares data 302 (in column 402), and the corresponding curve-fitted points for each of the curves 310-316, in columns 404-410, respectively, each shown in 10 minute increments, as shown in column 402. Other time increments may be used if desired, as discussed herein. Also, at each of the share data points 302 (FIG. 3), there is a vertical line 320, which shows the absolute distance (or spread) between a given input shares data point 302 and the curves 310-316 attempting to be fit. For curve fitting, each of the curves 310-316 is fit to the input shares data using a curve fitting technique, such as "Least Squares" (or other curve fitting technique) to find the parameters of the curve that gives the least squared error to the shares data. Least Squares fitting is a known mathematical procedure for finding the best-fitting parameters of a proposed function or curve to a given set of points by minimizing the sum of the squares of the offsets (or "the residuals") of the points from the curve. An example of the Least Squares curve fitting technique is described in the following reference and incorporated herein by reference to the extent needed to understand the present invention, to the extent permitted by applicable law: https://services.math.duke.edu/education/ccp/materials/linalg/curvefit/curvfit1.html.

Figure 5:
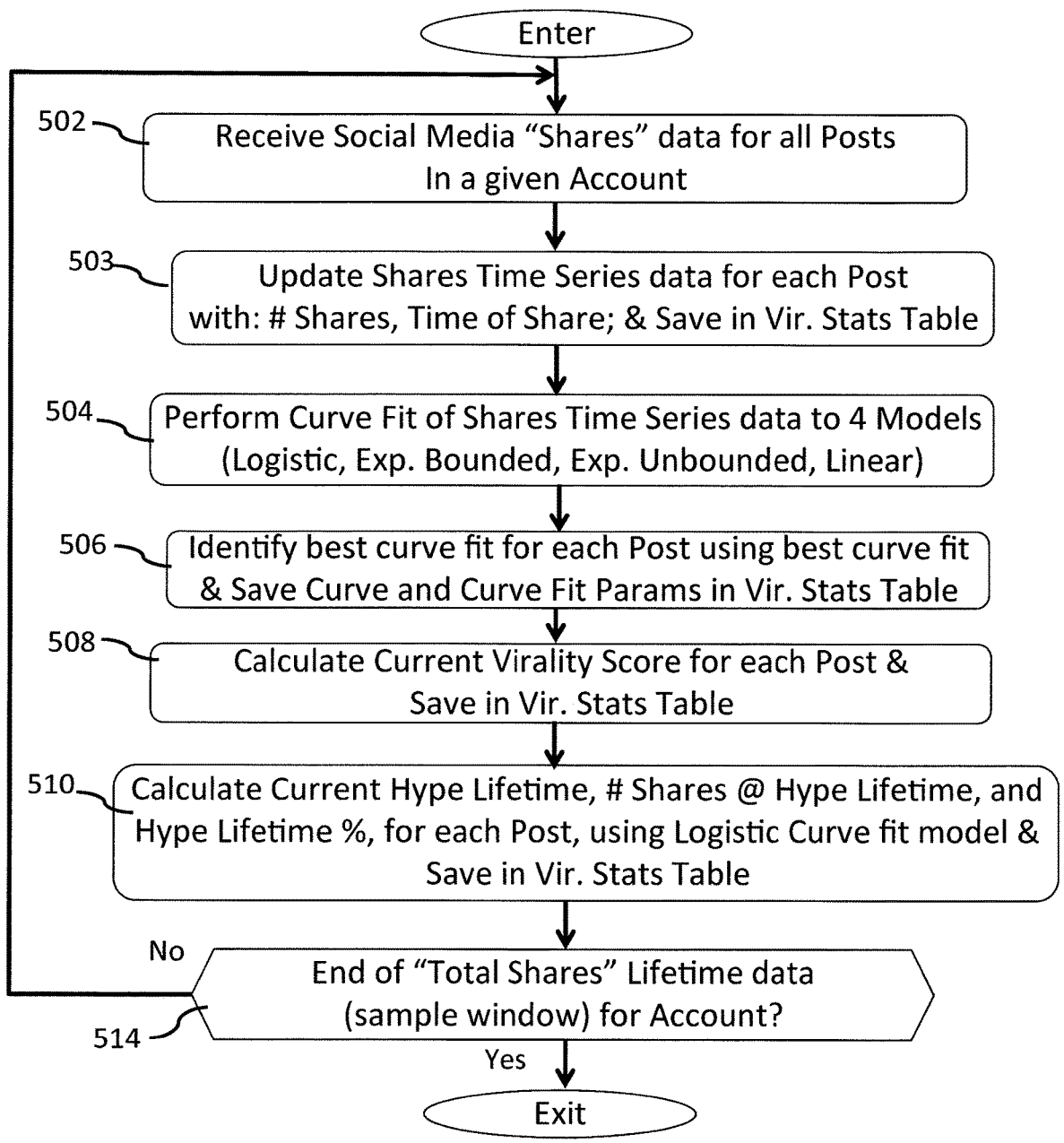
FIG. 5 is a flow diagram of one of the components of FIG. 2, in accordance with embodiments of the present disclosure.

Referring to FIGS. 2, 5 and 6, the Virality Stats Logic 220 (FIG. 2) analyzes shares data on the lines 202, 204 from the social media servers 30 and the post/article server 22, respectively, to calculate certain key metrics associated with the dissemination of the posts, and stores the metrics in a Virality Stats (or VS) table (or database) 600 (FIG. 6), which is saved on the Virality Stats (or VS) Server 36 (FIG. 2).

As discussed above, the Social Media Server(s) 30 provide "shares" data associated with "shares" data relating to each post over time, such as: shares, Facebook "likes", re-tweets, comments, favorites, and the like, for each social media account associated with various social media platforms, e.g., Facebook, Twitter, Snapchat, and the like, and the shares data is typically updated at a predetermined rate, e.g., once every 10 min, or other rates, as discussed herein.

Referring to FIG. 6, in particular, the Virality Stats (or VS) table 600 has a first column 602 on the left of the VS table 600, which is a Post ID number, e.g., P1-1 to P1-n, to uniquely identify each social media post for a given social media account. Column 602 is followed left to right by columns 604-622 associated with various calculated metrics or characteristics associated with each post. Column 604 contains a shares time series of data associated with the post, which may increase each time new data is read from the social media servers 30 added to the shares time series. Column 606 has the Date/Time of the post, column 608 has the Current Date/Time when the data was retrieved from the social media server 30, column 610 indicates the Current Best Fit Curve, e.g., Linear, Exponential Unbounded Exponential Bounded, Logistic, and whether it indicates viral (V) or non-viral (NV) type of dissemination, and column 612, which provides the curve fit parameter values associated with the current best curve fit listed in column 610, which may be used to calculate a Virality Score, as discussed hereinafter. The column 612 also holds the curve fit parameter values for the Logistic curve fit (even if not the best fit), which may be used to calculate Hype Lifetime, a measure of the time during which a certain content has been popular, as discussed hereinafter. Column 612 shows the coefficient labels (e.g., K, B0, B1, A, B, C, M) for illustration purposes; however, the table 600 would have actual parameter values when in use. To the right of column 612 are: column 614 for the Current Virality Score, column 616 for a Current Hype-Lifetime ($T_h$) in hours, column 618 for a Current # Shares at the Hype-Lifetime, column 620 for a Current Hype- Lifetime percentage (%), and column 622 for Ex-Post Time (Txp), e.g., the current elapsed time after the post.

Referring to FIG. 5, a flow diagram 500 illustrates one embodiment of a process or logic for implementing the Virality Stats Logic 220 (FIG. 2). The process 500 begins at a block 502, which retrieves social media shares data for all posts in a given social media account (e.g., post 1 to post n). Next, a block 503 stores the shares data, including the number of shares (# shares) and the time of the share, as part of a shares time series (e.g., elapsed time: total # shares), and stores the current shares data by adding it to the Shares Time Series column 604 of the Virality Stats Table 600 on the Virality Stats Server 36 (FIG. 2). The shares time series 604 gets updated to add new shares data with each pass of the logic 500 for all posts that have new shares data available for that post. The block 503 also saves the date/time of the post (column 606, FIG. 6), when a post is being updated for the first time, and saves the current date/time (column 608, FIG. 6) for each updated post, in the Virality Stats Table 600 on the Virality Stats Server 36.

Next, a block 504 performs a curve fit of the shares time series data to exemplary 4 models (exponential, exponential bounded, logistic, and linear), using a Least Squares or other curve fitting method as discussed herein above with FIGS. 3 and 4.

Next, a block 506 identifies the best curve fit model for each post as the one with the lowest Bayesian Information Criteria (or BIC) score and saves the curve and the curve fit parameter values in the Virality Stats Table 600 on the Virality Stats Server 36. Other selection criteria to determine the best curve fit model may be used if desired.

The below equations 1-4 (Eq. 1 to Eq. 4) may be used for the four curve models, with Eq. 1 for Exponential Unbounded, Eq. 2 for Exponential Bounded, and Eq. 3 for Logistic, and Eq. 4 for Linear, as shown below, where y is the number of shares and t is time:

$$y = A^* B^t + C \text{ (Exp. Unbounded)} \quad \text{Eq. 1}$$

$$y = A^* (1 - e^{Bt}) \text{ (Exp. Bounded)} \quad \text{Eq. 2}$$

$$y = \frac{K e^{B_0 + B_1 t}}{1 + e^{B_0 + B_1 t}} \text{ (Logistic)} \quad \text{Eq. 3}$$

$$y = Mt + B \text{ (Linear)} \quad \text{Eq. 4}$$

Next, a block 508 calculates a current Virality Score, for each updated post, indicative of the rate of sharing for each post, by extrapolating from the current best curve fit (using the appropriate equation with the corresponding current curve fit parameters) a "future shares" count data point, and then dividing this "future shares" count by the total Ex-Post time (Txp) for that post, i.e., calculating the slope of a line that goes through the "future shares" data count at that time and through the origin. Thus, the Virality Score provides a real-time indication about the rate of sharing or the rate of change (or growth) of the shares at a given time. For example, referring to FIG. 3, if the best curve fit model for a given post at a given update time is the exponential unbounded curve 310 and the shares data update time is 70 min. from the post ("ex-post" time or Txp), the block 508 would select a future time, e.g., about 74 min., and calculate a future shares value 324 of 2,800 shares using the current curve fit parameters 612 for curve 310 in the Virality Stats table 600. Then, dividing 2,800 shares by 74 min. results in a Virality Score of about 37.8 shares/min, which is the slope of the line 326 through the future shares data count 324 at that point in time and through the origin (when time=0 min, or when the post was first posted online). In the above example, an incremental future time of 4 min. was used for illustration purposes. Other incremental future times may be used if desired.

Next, a block 510 calculates the current Hype Lifetime, # shares at the Hype Lifetime, and the Hype Lifetime % for each post, all using the Logistic Curve fit model (independent of whether the Logistic Curve fit was the best current curve fit) and stores the results in the Virality Stats Table 600 in the appropriate columns 616-620. In particular, the Hype Lifetime ($T_h$) is an indication of how long the content was popular, which may be computed by determining at what time the shares reach the midpoint of the logistic curve fit, i.e., the inflection point in the curve where the gradient changes from increasing to decreasing, which is the midpoint for the logistic curve shown in this example. In addition, the Hype Lifetime % ($T_h\%$ or HLP) is the percentage of current ex-post time ($T_{XP}$) that was spent in the near exponential growth rates, or the % of ex-post time that the shares spent at the midpoint (or inflection point) of the logistic curve. As the ex-post time is constantly changing the HLP is also constantly changing, until the system stops sampling shares data. For example, referring to FIG. 3, if the Logistic Curve fit model for the shares data 302 of a given post at a given update time is the logistic curve 314, the Hype Lifetime $T_h$ would be the time when the logistic curve 314 is at a value of one-half of its final value (K). In that case, the final value (K) of the curve 314 is 4,000 shares, and thus one-half of its final value (K/2) is 2,000 shares and $T_h$ is the time when the curve 314 is at 2,000 shares, which is at approximately 55 min. Thus for this example, $T_h$ is approx. 55 min., as shown in the graph 300.

The value of the Hype Lifetime $T_h$ may be determined analytically by the block 510 by plugging in the value of K/2 for the number of shares (y) in Eq. 3 and solving for time (t), as shown by the below equation 5 (Eq. 5), and then plugging in the current Logistic curve fit parameter values (column 612) from the virality stats table 600.

$$t(\text{at } y=K/2)=T_h=-(B_0/B_1) \quad \text{Eq. 5}$$

Where $B_0$ and $B_1$ are updated each time the logic updates the curve fit information in the Virality Stats Table. Also, at the hype lifetime $T_h$, the estimate for the value of the current number of shares is K/2, which can be calculated from the value of K determined from the curve fit parameters (column 612, table 600, FIG. 6), divided by 2 (or K/2).

Also, in the same example of FIG. 3, the Hype Lifetime % (HLP), would be the determined by dividing the Hype Lifetime $T_h$ by the current ex-post time (Txp) and multiplying by 100, as shown in the below equation 6 (Eq. 6).

$$HLP=(T_h/T_{XP})^*100 \quad \text{Eq. 6}$$

In this case, the value of $T_h$ is 55 min (or 0.91 hrs), and if the current value of $T_{XP}$ is 100 min. (or 1.66 hrs), the value of Hype Lifetime % (HLP) would be 55%. The value of $T_h$ will continue to change with each shares data update until the total number of shares reaches a constant or steady state value (i.e., the value of K in Eq. 3). Thus, the block 510 may also determine when the diffusion (i.e., dissemination) has reached steady state by checking for when $T_h$ or when the number of shares has not changed by more than a predetermined amount. For example, when the $T_h$ or the number of shares has not changed by more than, e.g., 1%, over a predetermined time period or number of samples, e.g., 1 hour, the block 510 may determine that the post dissemination has reached steady state. Other values for the steady state level or % value and time or sample criteria may be used if desired. If a steady state condition is detected, the logic may set a steady state flag, which may be saved on the Virality Stats Server 36, or may provide an alert (e.g., pop-up message, email or text message) to the user 15 (FIG. 1) to indicate steady state has been reached.

While the hype lifetime $T_h$ and the number of shares may reach steady state, the value of HLP will continue to change as the ex-post time $T_{XP}$ continues to increase with time, until the system stops sampling shares data. Thus, the HLP can be used to identify key information about the on-going dissemination of the post. If the number of shares stop increasing (i.e., becomes "flat"), the HLP value will decrease rapidly over time. Similarly, if the number of shares continues to increase, the HLP value may increase or remain flat or decrease slightly, depending on the rate of increase in the shares. For example, if the shares increase is such that hype lifetime $T_h$ increases at the same rate as the ex-post time $T_{XP}$ increases, the HLP value will be constant over time. However, if the shares increase is such that hype lifetime $T_h$ increases faster than the ex-post time $T_{XP}$ increases, HLP will increase with time. Similarly, if the shares increase is such that hype lifetime $T_h$ increases not as fast as the ex-post time $T_{XP}$ increases, HLP will decrease with time.

After the block 510 calculates the parameters discussed above, a block 514 determines if the time after the post (or ex-post time or Txp) for each post has reached the end of the desired time window for performing real-time sampling and dissemination or shares analysis on the posts, i.e., "total shares" lifetime, or sample window, "total sample" lifetime (or TO, e.g., 24 hours. If YES, the process 500 exits. If it has not, the process proceeds to the block 502 to retrieve the next "shares" data update. In some embodiments, the process may wait to retrieve the next segment of social media shares data until of shares data is ready to be retrieved.

Figure 6A:
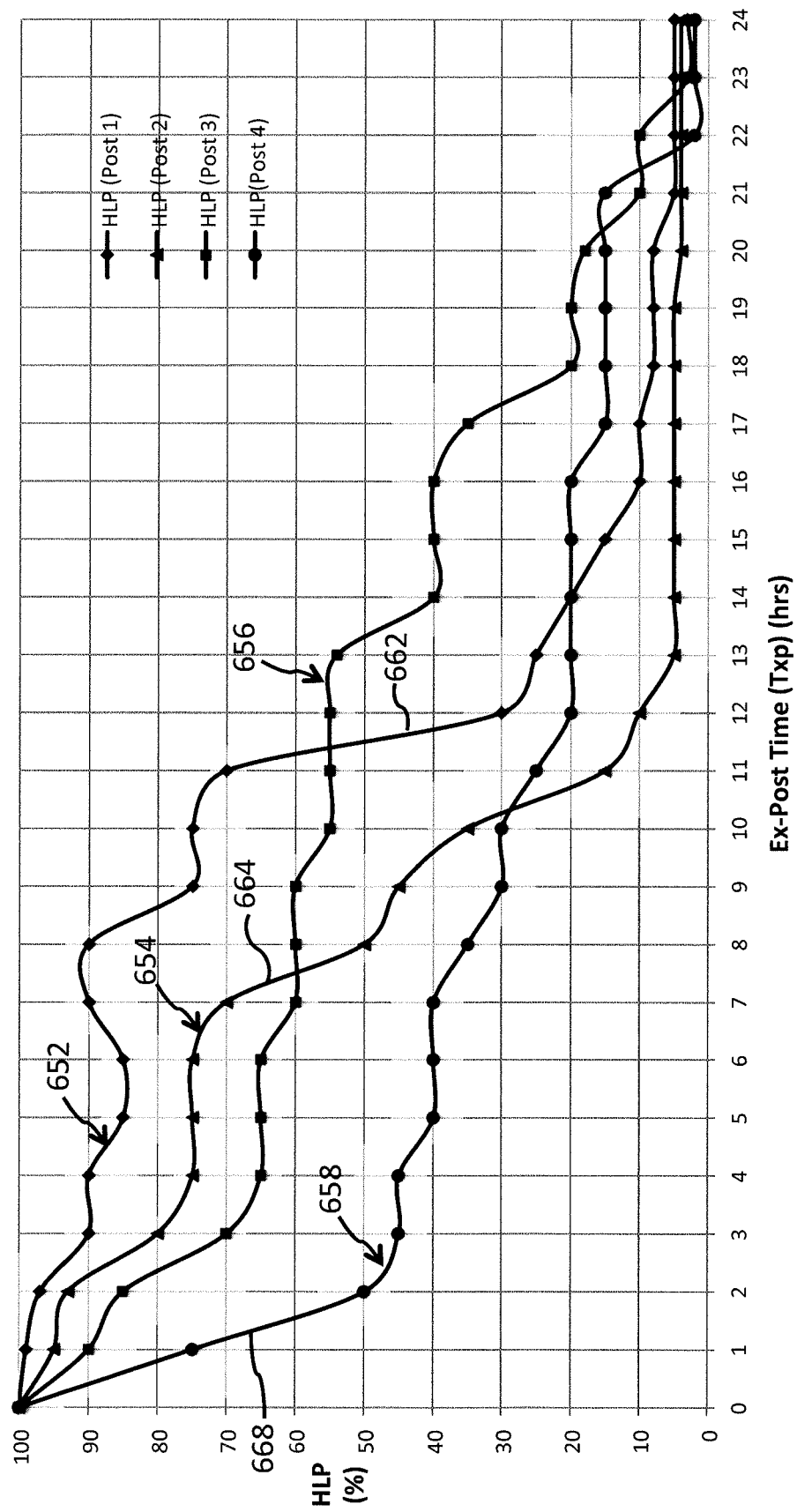
FIG. 6A is a graph of Hype Lifetime Percentage (HLP) vs. Ex-post time (Txp) for four sample posts, in accordance with embodiments of the present disclosure.

Referring to FIG. 6A, a graph 650 of Hype Lifetime Percentage (HLP) vs Ex-post time (Txp) shows four HLP curves 652,654,656,658 for four sample Posts Post1-Post4, respectively (different from the four sample posts shown in FIG. 6), from the posting time (Txp=0) to the end of the sample lifetime (Txp=$T_L$) e.g., 24 hrs. Each of the curves 652-658 begins at 100% for illustrative purposes. The HLP curve 652 for Post1 begins at 100% and stays at or above 90% for about the first 4 hours after the post, is at or above 80% for about the first 8.5 hours after the post, and is at or above 70% for about the first 11 hours after the post, after which it drops down to 30% in 1 hour (from hour 11 to 12). The HLP curve 654 for Post2 begins at 100% and stays at or above 90% for about the first 2.5 hours after the post, is at or above 80% for about the first 3 hours after the post, and is at or above 50% for about the first 8 hours after the post, after which time it drops down to about 15% over the next 3 hours (from hour 8 to 11). The HLP curve 656 for Post3 begins at 100% and stays at or above 90% for about the first hour after the post, is at or above 80% for about the first 2.5 hours after the post, and is at or above 50% for about the first 13.5 hours after the post, after which it drops down to about 20% in the next 5.5 hours (from hour 13.5 to 18). The HLP curve 658 for Post4 begins at 100% and stays at or above 90% for about the first half-hour after the post, is at or above 75% for about the first hour after the post, and is at or above 50% for about the first 2 hours after the post, after which time it drops down to about 20% over the next 10 hours (from hour 2 to 12).

The HLP rate changes may be analyzed over time (e.g., by the Virality Stats Logic 220 (FIG. 2) or other logic), to identify trends or large changes in HLP and provide alerts or notifications (e.g., pop-up message in the GUI, email or text message or the like) to the user 15 (FIG. 1) to take certain actions based on such trends or changes, such as when HLP drops by a certain % over a certain period of time, e.g., 20%/hr. For example, a section 662 of the HLP curve 652 shows a 45% change in HLP from 70% to 25% over 2 hours (Txp hrs 11-13), a section 665 of the HLP curve 654 shows a 20% change in HLP from 35% to 15% over a 1 hour period (Txp hrs 10-11), a section 668 of the HLP curve 658 shows a 50% change in HLP from 100% to 50% over a 2 hour initial period (Txp hrs 0-2). In those cases, each of which meets the rate change of 20%/hr, the logic may set a flag or provide an alert in the GUI discussed herein, indicating a large change has occurred. Such flag/alert results may be stored on the Virality Stats Server 36 (FIG. 2). However, for a section 664 of the HLP curve 654 shows a 35% change in HLP from 70% to 35% over a 3 hour period (Txp hrs 7-10), the change is an 11.6%/hr change, which would not meet the 20%/hr rate change, so the logic would not set a flag/alert in this example. Other values for HLP rates of change (or multiple values) may be used for alerts if desired.

In addition, HLP values may be analyzed over time (e.g., by the Virality Stats Logic 220 (FIG. 2) or other logic), to identify when HLP crosses a predetermined value or level or threshold and provide alerts or notifications (e.g., pop-up message in the GUI, email or text message or the like) to the user 15 (FIG. 1) to take certain actions based on such values. For example, when the HLP for a given post drops below, e.g., 50%, the logic may set a flag or provide an alert, indicating an HLP threshold has been crossed for that post. Such flag/alert results may be stored in the Virality Stats Server 36 discussed herein. For example, the HLP curve 652 reaches 50% at 11 hrs, the HLP curve 654 reaches 50% at 8 hrs, the HLP curve 656 reaches 50% at 13.5 hrs, and the HLP curve 658 reaches 50% at 2 hrs. Other values for HLP thresholds (or multiple thresholds) may be used for alerts if desired. Also, a combination of HLP threshold and HLP rate of changes may be used for flags/alerts if desired. For example, the logic may require HLP to pass through 50% and have a rate of change of at least 20%/hr to trigger a flag or alert, or the logic may require either event to occur to trigger the alert. Any other combinations of thresholds and rates may be used if desired.

When such threshold or rate flags/alerts occur, a user or content editor/producer may decide to remove or adjust the content of the post, or may post additional content related to popular posts to achieve the desire results. For example, if the HLP for a post shows a significant rate drop or the HLP value reaches a low threshold value, a user or content editor/producer may decide to remove or adjust the content of the post to try to curtail the drop-off. However, if the HLP for a post shows a significant increase or reaches a high threshold value, a user or content editor/producer may post additional content related to the popular post to try to keep it popular longer.

Alerts or notifications may be also provided for any other parameters or values discussed or determined or calculated herein, if desired, such as any of the parameters in the Virality Stats Table 600, the Model Features Table 900, or the Virality Prediction Table 1300.

In addition, the total sample lifetime $T_L$ may be set as a system default value and stored on the Virality Stats Server 36, or set by the user, or set by the Virality Stats Logic 220 (FIG. 2), if desired. The total sample lifetime $T_L$ may be the same time for all posts, or may vary by post, or group of posts, having certain characteristics or attributes or features, if desired. For example, in some embodiments, if a post that has reached steady state (as discussed above), at a time, e.g., 2 hrs, much shorter than the default sample lifetime, e.g., 24 hrs, the total sample lifetime may be adjusted (e.g., by Virality Stats Logic 220) to be made shorter for that post. As another example, in some embodiments, if a post is anticipated (or expected or predicted) to have a short dissemination period or small expected shares growth, such as a shares prediction value obtained from the Virality Prediction & Update Logic 224 (discussed herein), the total sample lifetime $T_L$ may be set or adjusted by the logic accordingly. In that case, for example, if the shares are not predicted to double at the future prediction time, the total sample lifetime $T_L$ may be adjusted (e.g., by the Virality Stats Logic 220) to be shorter than a post that is predicted to triple in the same time period.

It should be understood that equations Eq. 1-Eq. 4 are representative examples of four types of specific curves or equations or functions that may be used to characterize the shares data. Any other equations or functions may be used if desired, provided they meet the functional and performance requirements described herein. For example, instead of using bounded exponential or logistic curves any parametric curve with an increasing (or growing) gradient (or slope), followed by a decreasing gradient, and an inflection point there-between may be used. In such a case, the inflection point may be used to calculate the "hype" parameters (e.g., hype lifetime (Th), HLP, # Shares at hype lifetime (K/2)). Similarly, for the unbounded exponential curve, any other equations or functions in the exponential family may be used to characterize such growth curves. Also, the number of curve fit options used may be more or less than four, if desired, and may vary from one post to the next, or may vary during the sample lifetime of a given post, depending on the type of post or other factors (such as those shown in the model features table 900). In that case, the Virality Stats logic 220 (e.g., block 504) would adjust accordingly to the number and type of curve fit options.

Referring to FIG. 7, the Virality Stats logic 220 (FIG. 2) analyzes the data from a plurality of social media accounts, and saves the results in the Virality Stats Server 36 as a plurality of tables 700. The front-most table 600 shows the Virality Stats table 600 from Social media Account #1, followed by Virality Stats tables 702, 704, and 706, indicative of Social Media Accounts #2, #3, #N, respectively. In some embodiments, the Virality Stats logic 220 may optionally be run on multiple computers or servers such as that shown by multiple Virality Processing Logics 38 (FIG. 1), where the logic on each server analyzes a separate Social Media Account and each stores the results in their respective Virality Stats Table on the Virality Stats Sever 36.

The present disclosure also predicts future dissemination (or shares rate) of the posts using an iterative predictive classification-based modeling approach and various model features data, as discussed hereinafter.

Referring to FIGS. 2, 8, and 9, the Model Features Logic 222 (FIG. 2) calculates or retrieves various model parameters "features" data and saves them in a Model Features (or MF) Table 900 (FIG. 9) in the Model Features Server 38 (FIG. 2) for use by predictive models in the Virality Prediction & Update Logic 224.

Referring to FIG. 9, in particular, the Model Features table 900 has a first column 902 on the left of the MF table 900, which is a listing of the Model Features data (per post) for predictive modeling in accordance with the present disclosure, where each row has a feature description, as described in more detail below. Column 902 is followed left to right by column 904 associated with the source of the data for each feature, including the Virality Stats Server (VSS), Social Media Server(s) (SMS), Model Features Logic (MFL), Sentiment/Topic Server (STS), Post/Article Server (PAS), and columns 906-908, which represent the values for each of the model features listed in column 902 for each of the posts for a given account, e.g., P1-1 to P1-n. Other similar tables may be used for the model features for each social media account, similar that described with FIG. 7 for the multiple Virality Stats Tables 600,702-706. Other data management techniques may be used if desired to manage data for posts from multiple social media accounts. Column 902 is segmented into groups of features, including "Virality & Stats" based features, "Post/Article" based features, "Comment" based features, "External" based features, and "Account" based features, and each specific feature is listed in the table 900. Other features and other feature groups or sections or segments may be used if desired.

Referring to FIG. 8, a flow diagram 800 illustrates one embodiment of a process or logic 800 for implementing the Model Features Logic 222 (FIG. 2). The process 800 begins at a block 802, which waits (or delays further execution) until the Ex-Post wait time Tw (e.g., 1 hour) has passed for a post, before continuing with the process 800 for that post. The Ex-Post wait time delay is intended to allow enough shares data to be collected on a given post to perform a reliable prediction by the Virality Prediction & Update Logic 224 (discussed hereinafter). Other wait times may be used if desired, provided it provides the functions and performance described herein. Next, a block 804 retrieves or calculates, as appropriate, the "Virality & Stats" based features 910 listed in table 900 (FIG. 9) from the Virality Stats Server (VSS) 36 and the Social Media Server (SMS) 30, as needed, for all posts in a given social media account that are past the Ex-Post wait time. In particular, the Virality Score at end of ex-post Wait Time (from VSS), the Hype Lifetime Percent HLP or Hype Lifetime $T_h$ or number of shares at $T_h$ (K/2) at end of ex-post Wait Time (1 hr), Total # Likes on Post/Article at end of ex-post Wait Time (from SMS), Total # Comments on Post/Article at end of ex-post Wait Time (from SMS), Total # Shares of Post/Article at end of ex-post Wait Time (from VSS), and Date/Time of Post (from VSS), are each retrieved or calculated, and stored, in the Model Features table 900. If certain information is not available from these servers, it may be retrieved from the Post/Article Server (PAS) 22, or one of the other servers described herein.

Next, a block 806 retrieves or calculates, as appropriate, the "Post/Article Content" based features 912 listed in table 900 (FIG. 9) from the Post/Article Server (PAS) 22, Sentiment/Topic Server(s) (STS) 42 the Social Media Server(s) (SMS) 30, and the Model Feature Logic (MFL), as needed, for all posts in a given social media account that are past the Ex-Post wait time. In particular, the Length of post/article (e.g., # of words per sentence) (from PAS/SMS), # Named Entities used in post/article (from PAS/SMS), Sentiment of Post (positive, negative, neutral) (from STS), Diversity/Generality of Topics of Post ("topic separation")(1-10) (from STS), and Topic Similarity with last few Posts (1-10) (from STS), Type of Article content (Text, Image, Video, Hybrid) (from MFL), and # Images in Article content (from MFL), are each retrieved or calculated, and stored, in the Model Features table 900. If certain information is not available from the servers described above, it may be retrieved from the Model Feature Logic (MFL) or the Post/Article Server (PAS) 22, or one of the other servers described herein.

Figure 10:
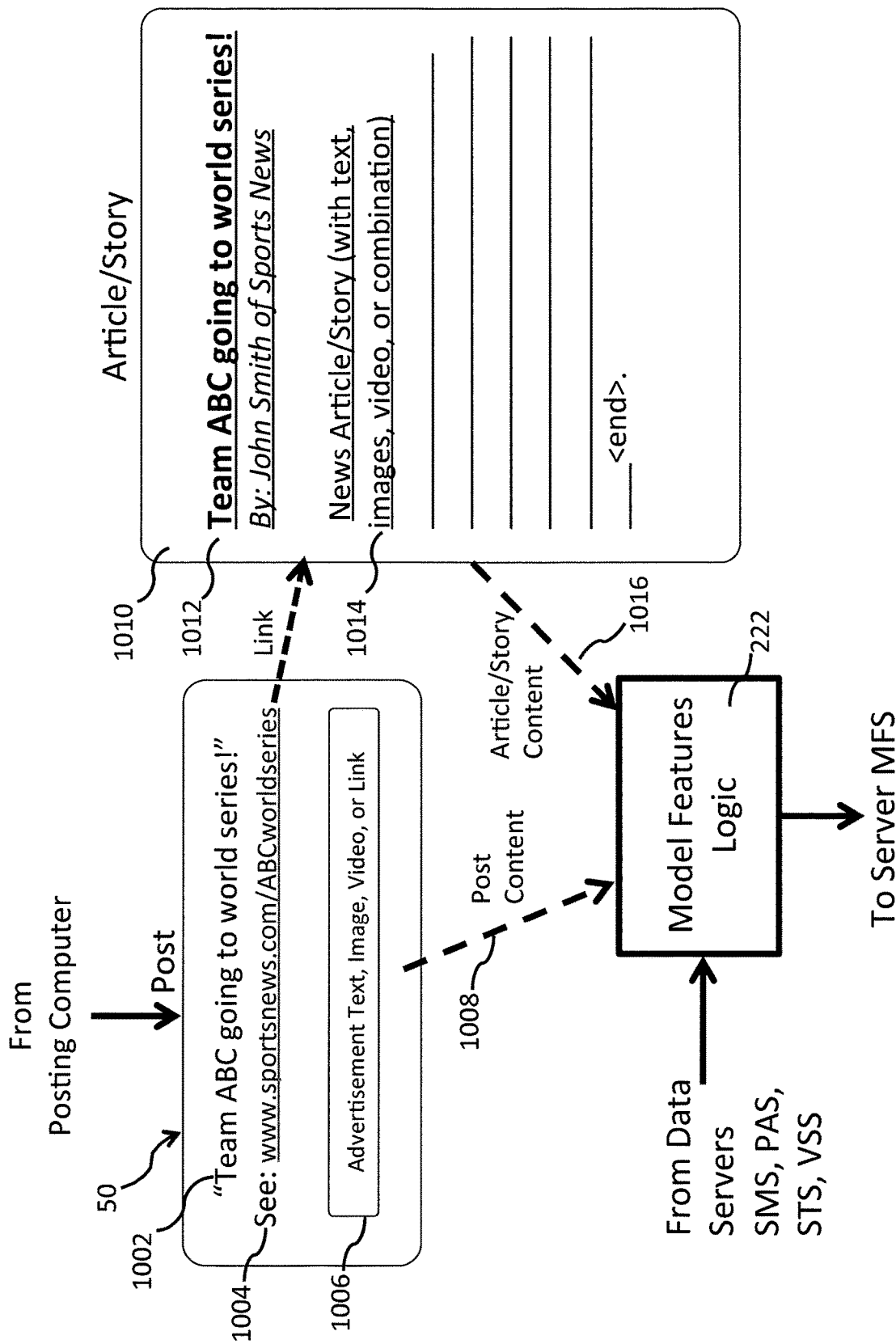
FIG. 10 is a diagram showing a post and article and one of the components of FIG. 2, in accordance with embodiments of the present disclosure.

Referring to FIG. 10, as discussed herein, the post 50 from the posting computer 12 (FIG. 1) associated with a media network (e.g., a sports network), is posted to the social media servers 30 and the associated websites, and viewed by the social media users or followers. The post 50 may have a title 1002, e.g., "Team ABC is going to the World Series!", and a web link 1004, e.g., "www.sportsnews.com/TeamABCworldseries," which, when clicked on by a user, brings the user to an online article (or news story) 1010 about the title. The type or format of the article (or story) may be text only, or may have text, images, video, or a combination (or hybrid) of any or all of these. In addition, the post 50 may also have an advertisement 1006 embedded in or linked to the post 50. Thus, understanding the level of dissemination of a post can also relate to value or price to place an advertisement on a post. The Model Features Logic 222 receives the content of the post 50 and the article 1010, via the servers and network connections discussed herein (such as PAS 22, SMS 30), as indicated by the dashed lines 1008 and 1016, respectively, and analyzes the content as described herein in view of other data received from SMS 30, PAS 22, STS 42, and VSS 36, and provides results to the Model Features Server 38.

Referring to FIGS. 8 and 9, the "Sentiment of Post" feature data may be obtained from sentiment analysis software or natural language processing algorithms and software, such as Natural Language Toolkit (NLTK) library, or SciKit-Learn machine learning software, which may be run on the sentiment/topic server 42. The text of the post may be provided to the Sentiment/Topic server 42 and the server 42 provides the sentiment results (positive, negative or neutral) for the post.

Figure 11:
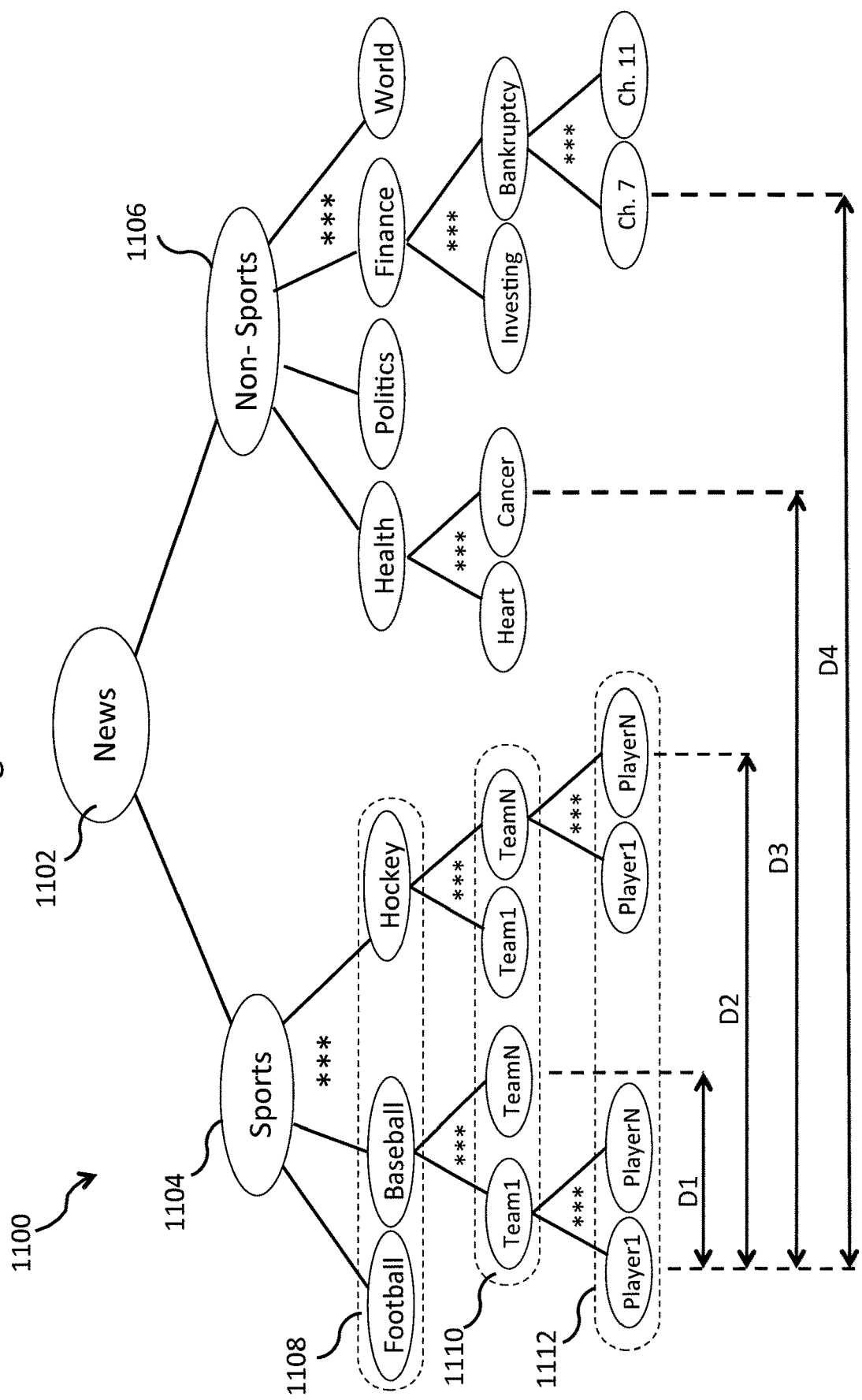
FIG. 11 is a topic ontology for the general topic of "news", in accordance with embodiments of the present disclosure.

Referring to FIG. 11, the "Diversity/Generality of Topics of Post" feature data are an indication of how diverse the topics are in the post, and may be calculated by determining the distance between topics in the post. To compute the distance, an ontology (or hierarchical tree) 1100 may be created that is relevant to sports media and a sports media network, e.g., ESPN, and stored on the Model Features Server 38. The Model Features logic 222 determines the topics present in the post or article using topic discovery techniques, as discussed further below. The logic 222 then computes the average distance, e.g., the shortest path distance, between every pair of topics in the post, as a measure of the diversity of the topics in the post. One way to calculate the distance between two topics is to count the number of nodes that must be passed through to get from a first topic to a second topic, where the larger number of nodes, the greater the topical distance. The nodes may be given weights, based on their level in the tree, e.g., the higher the node the greater the weight, or based on their topic. Any other technique may be used to compute the topic distance of the post if desired.

In FIG. 11, a sample ontology (or hierarchical tree) 1100 for the general topic of "news" is shown, starting at a high level node 1102 labeled "news". One way to represent a "news" ontology is to show a second level having "sports" news on one node 1104 and "non-sports" news on another node 1106. Under the "sports" node 1104 are a series of specific sports nodes 1108, representing specific sports, such as football, baseball, basketball, soccer, hockey, and the like. Under each of the sports nodes 1108 there is a series of sports teams nodes 1110 connected to each of the sports nodes 1108, and under each of the teams nodes 1110 is a series of players nodes 1112.

The broader the topics of discussion in a post, the greater the likelihood of reaching a broader audience, and thus the better chance of having viral sharing of posted content, such as is discussed in Lilian Weng, et al., "Virality Prediction and Community Structure in Social Networks," Scientific Reports, August 2013, which is incorporated herein by reference to the extend needed to understand the present invention.

For example, if a post is discussing only player1 on team1 of in the sport of baseball, the breadth of topics (and thus the audience) will be small. If a post is discussing player1 on Team 1 and Team N, the topic distance is shown as D1. If a post discusses Player 1 in Baseball and Player N in Hockey, the distance D2 if further still and is likely to attract a broader audience. However, if the post discusses Player 1 in Baseball and a story about Player 1 having a health issue, e.g. cancer, the topic distance would be much larger and is likely to attract a still broader audience. In another example, if the post discusses Player 1 in Baseball and a story about Player 1 having finance issues, e.g. bankruptcy, the topic distance would be much larger than the sports only post/article, and is likely to attract a broader audience than the sports only story.

In addition, "Topic Similarity with last few posts" is an indication of how similar the topics are for successive posts during a period when the trend was "viral." These feature data are useful because typically at the beginning of a "hype", i.e., when shares are increasing at a fast rate (such as near the hype lifetime $T_h$, see FIGS. 3, 6), posts having high topic similarity with the last few posts (e.g., the last 3 to 10 posts/articles) may help drive growth in views of the post (and thus drive further dissemination or shares). However, at or near the end of the "hype", posts that are dissimilar, i.e., high topic "dissimilarity," may drive growth of views and dissemination. Such topic similarity or diversity may be measured using a cosine distance on the topic vector of the article or post.

For example, if a well known athlete passes away, the first few articles about the athlete's health in their last days might start to have significant shares. This is the period when one might see the "hype" around that topic rising. Eventually, people will lose interest in this information, and the number of shares will start to drop. During this time, a news agency might shift-gears and start to produce articles about the athlete's achievements. A certain time may come, however, when people will have lost interest in consuming any information about the athlete, and the number of shares around that athlete will begin to drop. There may also be multiple different topic shares data curves for the athlete, where the over-arching topic is that of the athlete and there are sub-topics around different types of information about that athlete. Thus, as the shares data for a post rises, producing new content that is similar to recently produced content might be popular as this new content can "ride the wave" of popularity of the original post. However, towards the end of the topic "hype", i.e., as the shares data reaches steady state, dissimilar topics articles may have a better chance at getting more interest from people.

The topic of a post or article may be obtained using topic modeling analysis software, such as Gensim or an algorithm using, e.g., Latent Dirichlet Allocation (LDA) topic modeling, which may be run on the sentiment/topic server 42 (FIG. 1). Other techniques may be used if desired to provide the topic information. The text of the post or article may be provided to the Sentiment/Topic server 42 and the server may provide the topic results (e.g., a list of topics or topics vector) for the post/article.

Referring again to FIG. 8, next, a block 808 retrieves or calculates, as appropriate, the "Comment" based features

914 listed in table 900 (FIG. 9) from the Sentiment/Topic Server(s) (STS) 42 and the Social Media Server(s) (SMS) 30, as needed, for all posts in a given social media account that are past the Ex-Post wait time. In particular, # of Commenters to Post/Article ("first level") (from SMS/ MFL), Single Comment with the most "Likes" (CML) (from SMS/MFL), # "Likes" on the single Comment with most Likes (L-Max) (from SMS/MFL), # Replies on most "Liked" single Comment (R-L-Max) (from SMS/MFL), Single Comment with the most "Replies" (CMR) (from SMS/MFL), # "Replies" to single Comment with most Replies (R-Max) (from SMS/MFL), # Likes on most Replied-to single Comment (L-R-Max) (from SMS/MFL), Sentiment on Replies to single Comment with most Likes (S-R-L-Max) (from STS/MFL), and Sentiment on Replies to single Comment with the most Replies (S-R-Max) (from SS/MFL), are each retrieved or calculated, and stored, in the Model Features table 900 (FIG. 9). If certain information is not available from the servers described above, it may be retrieved from the Model Feature Logic (MFL) or the Post/Article Server (PAS) 22, or one of the other servers described herein.

Next, a block 810 retrieves or calculates, as appropriate, the "External" based features 916 listed in table 900 (FIG. 9) from the Sentiment/Topic Server(s) (STS) 42 and the Model Feature Logic, as needed, for all posts in a given social media account that are past the Ex-Post wait time. In particular, % of the top 5 trending topics included in the Post/Article (from STS/MFL) is retrieved or calculated, and stored, in the Model Features table 900 (FIG. 9). If certain information is not available from the servers described above, it may be retrieved from the Model Feature Logic (MFL) or the Post/Article Server (PAS) 22, or one of the other servers described herein.

Next, a block 812 retrieves or calculates, as appropriate, the "Account" based features 918 listed in table 900 (FIG. 9) from the Social Media Server(s) (SMS) 30, as needed, for all posts in a given social media account that are past the Ex-Post wait time. In particular, the number of followers on the Account associated with a given post (from SMS) is retrieved or calculated, and stored, in the Model Features table 900 (FIG. 9). After the block 812 is completed, the process 800 exits. If certain information is not available from the server(s) described above, it may be retrieved from the one of the other servers described herein.

Referring to FIG. 9, for example, for the post P1-1 (column 906), i.e., Post1 for Social Media Account 1, the column 906 of the Model Features table 900 shows an example of possible values for each of the features in the corresponding rows that are provided by the Model Feature Logic 800.

Figure 12:
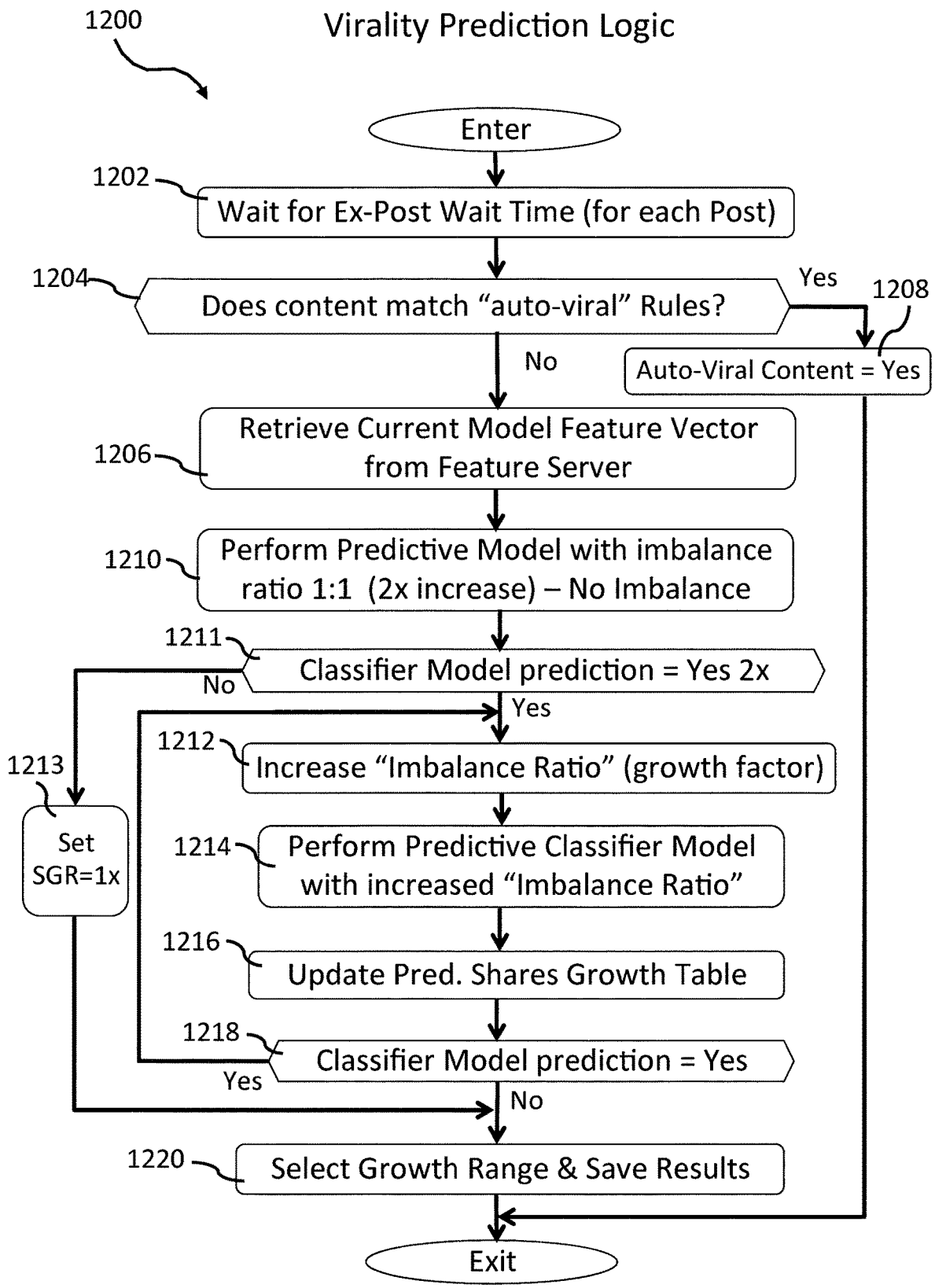
FIG. 12 is a flow diagram of a portion of one of the components of FIG. 2, in accordance with embodiments of the present disclosure.

Referring to FIG. 12, a flow diagram 1200 illustrates one embodiment of a process or logic 1200 for implementing a prediction portion of the Virality Prediction & Update Logic 224 (FIG. 2). The process 1200 begins at a block 1202, which waits (or delays further execution) until the Ex-Post wait time (e.g., 1 hour) has passed for a post, before continuing with the process 1200 for that post. As discussed herein, the Ex-Post wait time delay is intended to allow enough shares data to be collected on a given post to perform a reliable prediction. Other wait times may be used if desired, provided it provides the functions and performance described herein. The process 1200 is run only once for each post to provide the desired prediction information, thus, it is important to run the process 1200 only after sufficient amount of "shares" data has been collected to provide a confident virality prediction.

Next, a block 1204 determines whether the content of the post meets "auto-virality" rules obtained from the Virality Rule Server 40 (FIG. 2). If YES, a Virality Content flag is set to YES and the logic exits. This enables the logic 1400 to quickly determine whether a certain post will likely be "viral", and if so, indicate virality, without having to further analyze the post "shares" data and perform the prediction models. More specifically, examples of "auto-viral" content may include: content created around final sports games for a season (e.g., playoffs, world series, superbowl, Stanley cup, and the like) or important sports matches (e.g., Wimbledon, US Open, heavyweight boxing title, and the like), controversies in sports (e.g., player strike, controversial call in an important game, player suspension, and the like), attrition of high profile athlete (e.g., major or unexpected trade of a player, retirement or a player, and the like), death of a well-known athlete or sports figure, and the like. If the post relates to any of these triggers, the virality content flag will be set to YES and the process 1200 exits and will not be performed for that post. This is similar to a 'triage' process and may reduce a "lag" or delay time in content promotion based on viral posts. The "auto-viral" content triggers may be stored in a database or table on the Virality Rule Server 40 (FIG. 2), and updated from time-to-time as new rules or triggers are identified and existing ones are removed or modified over time, as discussed hereinafter with the Prediction Model Update logic 1400 (FIG. 14) portion of the Virality Prediction & Update Logic 224 (FIG. 2). The "auto-viral" content triggers may also be based on historical information collected by the Model Features Logic 222 (FIG. 2). For example, if a particular final game or important match has been shown to be viral in pervious years, such trigger information may also be stored (and updated) on the Virality Rules Server 40.

Also, the posting entity, e.g., sports media site, may attach one or more unique keyword(s) to the post or to metadata associated with the post (e.g., the word "auto-viral"), at the time of posting by the posting entity. In that case, the logic 1200 may look for the keyword(s) to trigger the "auto-viral" flag in block 1208.

If the result of block 1204 is NO, block 1206 retrieves the current Model Feature data (or Feature vector) from the Model Feature Server 38. Next, a block 1210 performs (or executes) a predictive model with an imbalance ratio of 1:1 (2×increase), which determines, based on the input feature data, whether the shares will double in time Tp, where Tp is the prediction time, e.g., 6 hours. Other prediction times may be used if desired.

Referring to FIG. 13, a Virality Prediction Table 1300, includes columns 1304-1316, and stores the predictive modeling results for each post and for a given social media account (other accounts may have similar tables associated therewith). In particular, column 1302 lists the Post ID unique identifier for each post (e.g., P1-1 to P1-n), and columns 1304-1312 shows predicted "shares" growth factors. More specifically, column 1304 is for when the model determines that the number of shares for the post/article is going to double (2×) at the prediction time (Tp). If so, a "Y" or "1" is placed in the corresponding field, if not, an "N" or "0" is placed in the field. Similarly, a column 1306 is for when the model determines that the number of shares for the post/article is going to triple (3×) at the prediction time (Tp), a column 1308 is for when the model determines that the number of shares for the post/article is going to quadruple (4×) at the prediction time (Tp), a column 1310 is for when the model determines that the number of shares for the post/article is going to multiply by 5 (i.e., 5×) at the prediction time (Tp), a column 1312 is for when the model determines that the number of shares for the post/article is going to multiply by 6 (i.e., 6×) at the prediction time (Tp). If so, a "Y" or "1" is placed in the corresponding field, if not, an "N" or "0" is placed in the field. Also, a column 1314 is provided to indicate the selected (or voted) predicted shares growth factor range (SGR), and a column 1316 is provided to indicate when the Virality Prediction Logic determines that the post content contains "auto-viral" content (AVC), which, when it is YES or Y, indicates that the prediction model may be skipped for that post, and when it is NO or N, indicates that not "auto-viral" content has been detected in the post and the prediction modeling should be performed. Also, a field 1318 is provided for the Prediction Time (Tp), e.g., 6.0 hours, and a field 1320 is provided for the Prediction Wait Time (Tw), e.g., 1.0 hours. Other values for Tp and Tw may be used, as discussed herein.

Referring again to FIG. 12, after performing block 1210 (2× increase model), a block 1211 determines whether the model results indicate there will be a 2× increase. If NO, a block 1213 sets the Shares Growth Range (SGR) to a value of "1×" and the logic proceeds to the step 1220, discussed hereinafter. If the result of block 1211 is YES, the 2× classifier model determined there will be a 2× increase in shares, and a block 1212 increases the "imbalance ratio" for the predictive model. Then, a block 1214 performs a predictive model with an imbalance ratio of 1:3 (3× increase), which determines, based on the input feature data, whether the shares will triple in the prediction time Tp, e.g., 6 hours. Next a block 1216 updates the Virality Prediction Table 1300 for the corresponding post and growth factor. Next, a block 1218 determines whether the result of the currently performed predictive model indicates there will be an increase for the growth factor of the current model. If YES, the process proceeds to the block 1212, which increases the "imbalance ratio" again for another iteration through the predictive model with an increased imbalance ratio (or growth factor). The amount of increase in the imbalance ratio (1:n) may be one multiplier each time, e.g., from 3× to 4× to 5× to 6×, etc., each of which may be called a "classifier" model, and the collection of models may be called an "ensemble of classifiers", discussed more hereinafter. If the result of block 1218 is NO, or after performing the block 1213, the currently performed predictive model indicates there will NOT be an increase for the growth factor of the current model and a block 1220 selects (or determines or votes on) the appropriate shares growth range multiple and stores the result in the Shares Growth Range (SGR) column 1314 in the Virality Prediction table 1300 (FIG. 13), and then the process 1200 exits.

Referring to FIG. 13, the selection (or voting) of the predicted shares growth range (SGR) may be performed by selecting the last two growth factors (or multiples) before where the prediction result changes to NO. For example, for post P1-1, the prediction growth result changed to NO for the 4× growth multiple, so the logic would select the prior two growth factors (2×-3×) as the select predicted growth range for that post, as indicated by the oval 1330. Similarly, for P1-2, the prediction growth result changed to NO for the 5× growth multiple, so the logic would select the prior two growth factors (3×-4×) as the select predicted growth range for that post, as indicated by the oval 1332. Also, for P1-3, the prediction growth result changed to NO for the 3× growth multiple, so the logic would select the prior two growth factors (1×-2×) as the select predicted growth range for that post, as indicated by the oval 1334. Also, for P1-4, the prediction growth result changed to NO for the 6× growth multiple, so the logic would select the prior two growth factors (4×-5×) as the select predicted growth range for that post, as indicated by the oval 1336.

Further, as an additional example post result P1-5, the prediction growth result changed to NO for the 2× classifier model, indicating there will not be a 2× growth in shares. In that case, the result 1338 in the 2× column 1304 indicates "N", and the SGR value is set to a value of "1×", to uniquely identify this situation apart from the other growth range predictions. Lastly, for a final additional example post result P1-6, the content of the post met on of the "auto-viral" triggers, and thus the AVC flag is set to "Y", and the SGR value may indicate "N/A" (or left empty or equivalent), indicating that the predictive model(s) were not performed (or executed) for this post, and the predicted growth factor columns 1304-1312 may be left empty (or indicate "N/A" or equivalent).

The predictive models used in the blocks 1210 and 1214 may be any type of predictive model "classifier", such as logistic regression, support vector machines (SVM), neural networks, decision tree classifiers, or the like. Using a predictive model to predict virality is difficult because a relatively low percentage of total posts actually go (or become) "viral," (or exhibit a dissemination indicative of exponential or logistic growth), resulting in a "class-imbalance" problem.

We have found that the class-imbalance problem can be avoided by formulating the prediction problem as a "classification" problem using an "ensemble of classifiers" (or group of classifier models). We have also found that incrementally increasing the "imbalance" in the predictive model over time enables the classifier models to identify a predicted growth factor range before the class-imbalance problem causes the results to be unreliable.

Each "classifier" model predicts whether the shares for a given post will increase (or multiply) by a factor of $\beta$ (a constant amount). For example, each "classifier" model (or each iteration of the model) may have a unique multiplier associated with it, e.g., 2×, 3×, 4×, 5×, etc., (pre-set before execution of the model) that indicates if the number of shares will increase by that factor at a prediction time Tp. This allows the logic to make incremental confidence-based "classifications." In general, as the multiplier increases, the confidence of the results decreases. However, the logic 1200 stops increasing the multiplier at the point at which the accuracy confidence drops below acceptable limits, e.g., when the result changes. Thus, the logic 1200 uses the "ensemble of classifiers" to turn a continuous prediction problem into a discrete prediction problem.

Thus, the present disclosure alleviates the class-imbalance problem by formulating the prediction problem as a "classification" problem using the "ensemble of classifiers" (or group of classifier models), as mentioned above, where each classifier model predicts whether the number of "shares" for a given post will multiply by the factor of $\beta$. Accordingly, the system and methods of the present disclosure predicts whether the number of shares for a given post will increase by a factor of $\beta$.

We have also shown that such an approach may be proven mathematically. In particular, we mathematically prove that the posts whose shares will multiply from k to $\beta k$ shares (i.e., by a factor of $\beta$), are present in $1/\beta$ of the data consisting of posts that have at least 'k' shares. Accordingly, the posts whose shares increase by a growth factor of $\beta$, are present in the $$\left(1 - \frac{1}{\beta}\right)$$

"quantile" of the data.

More specifically, if $x_m$ is the number of shares of a post at time 't', we want to determine which posts will reach $x = \beta x_m$ shares in time (t+k). Let 'p' be the fraction of the shares dataset beyond which we want to predict whether a post with $x_m$ shares will reach. It is known that the tail of large size exponential or "cascade"-type distributions (such as that shown in graphs 306 in FIG. 3) follows a "power law" distribution with a power ($\alpha$) of approximately 2 (or second order power law), such as that described in J. Cheng, et al., "Can Cascades be Predicted?", ACM International Conference on World Wide Web (WWW), 2014.

The $p^{th}$ quantile can be found by solving the following equation (Eq. 7):

$$\int_{x_m}^{\beta x_m} \frac{\alpha - 1}{x_m} \left(\frac{v}{x_m}\right)^{-\alpha} dv = p \qquad \text{Eq. 7}$$

Solving the integral of Eq. 7, gives:

$$1 - \left(\frac{x_m}{x}\right)^{\alpha - 1} = p \qquad \text{Eq. 8}$$

Substituting $$\frac{x_m}{x} = \frac{1}{\beta}$$

from above, gives:

$$p = 1 - \left(\frac{1}{\beta}\right)^{\alpha - 1} \qquad \text{Eq. 9}$$

Assuming $\alpha = 2$ (for second order power law distribution, from above), gives:

$$p = 1 - \frac{1}{\beta} \qquad \text{Eq. 10}$$

Thus, for $\beta = 2$, predicting 2× (double) shares multiple, would correspond to a ½:½ split (or median), or one half quantile the shares data indicates the number of shares will double at the prediction time Tp (e.g., 6 hours), and the other half of the shares data indicates it will NOT double. For $\beta = 3$, predicting 3× (triple) multiple, would correspond to a ⅔:⅓ split, or two thirds quantile (or Q(⅔)) of the shares data indicates the number of shares will triple at the prediction time Tp (e.g., 6 hours), and one third (⅓) of the data indicates the number of shares will NOT triple. Similarly, for $\beta = 4$, predicting 4× (quadruple) multiple, would correspond to a ¾:¼ split, or three quarters quantile (or Q(¾)) of the data indicates the number of shares will quadruple at the prediction time Tp (e.g., 6 hours), and one quarter (¼) of the data indicates the number of shares will NOT quadruple.

Thus, as discussed herein above, we have found that using the above approach allows the use of incremental confidence-based "classifications." In general, as also discussed above, as the multiple $\beta$ increases, the confidence in the resulting prediction decreases. However, as discussed herein, we can stop increasing $\beta$ at the point at which the accuracy confidence decreases below acceptable limits. We can then select (or "vote" on) the output of these classifier models to make a final growth factor prediction for a given post. Accordingly, the present disclosure uses an "ensemble of classifiers" to turn a "continuous" prediction problem into a "discrete" prediction problem.

Figure 14:
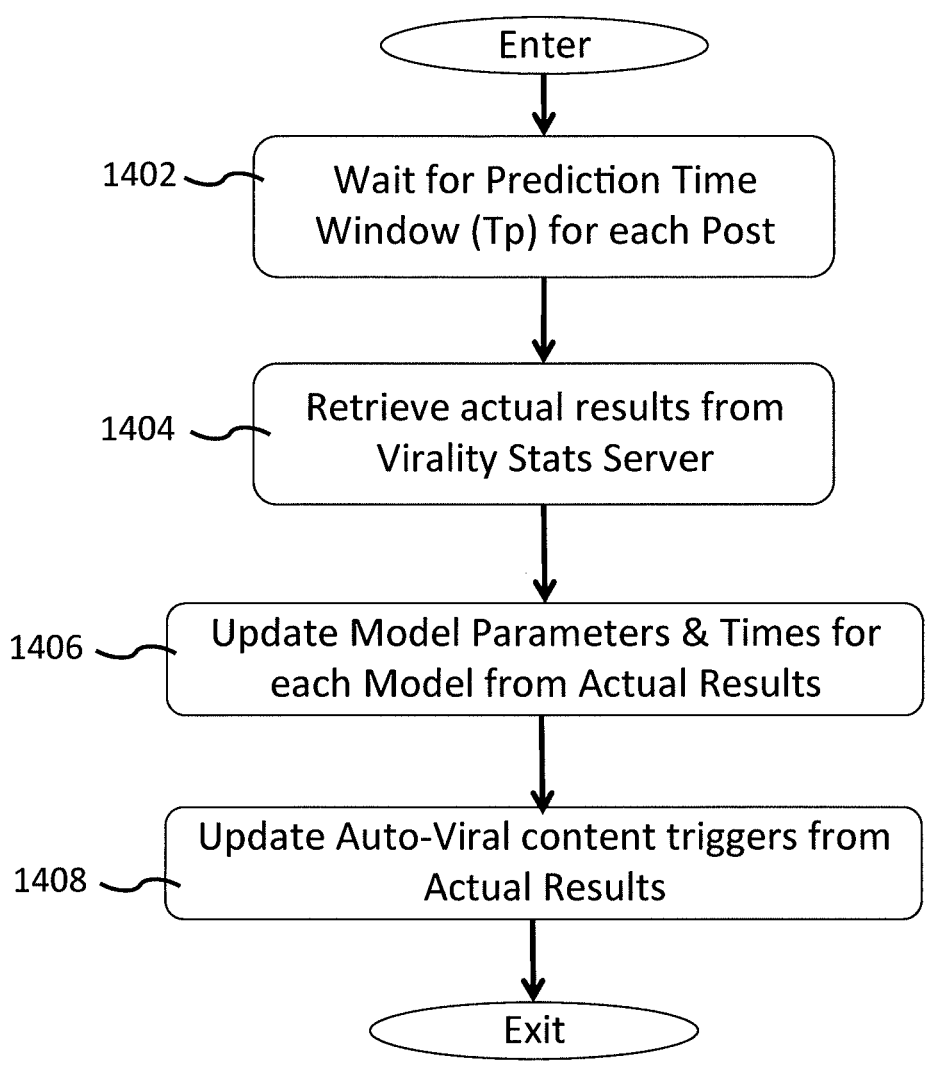
FIG. 14 is a flow diagram of another portion of one of the components of FIG. 2, in accordance with embodiments of the present disclosure.
Figure 15:
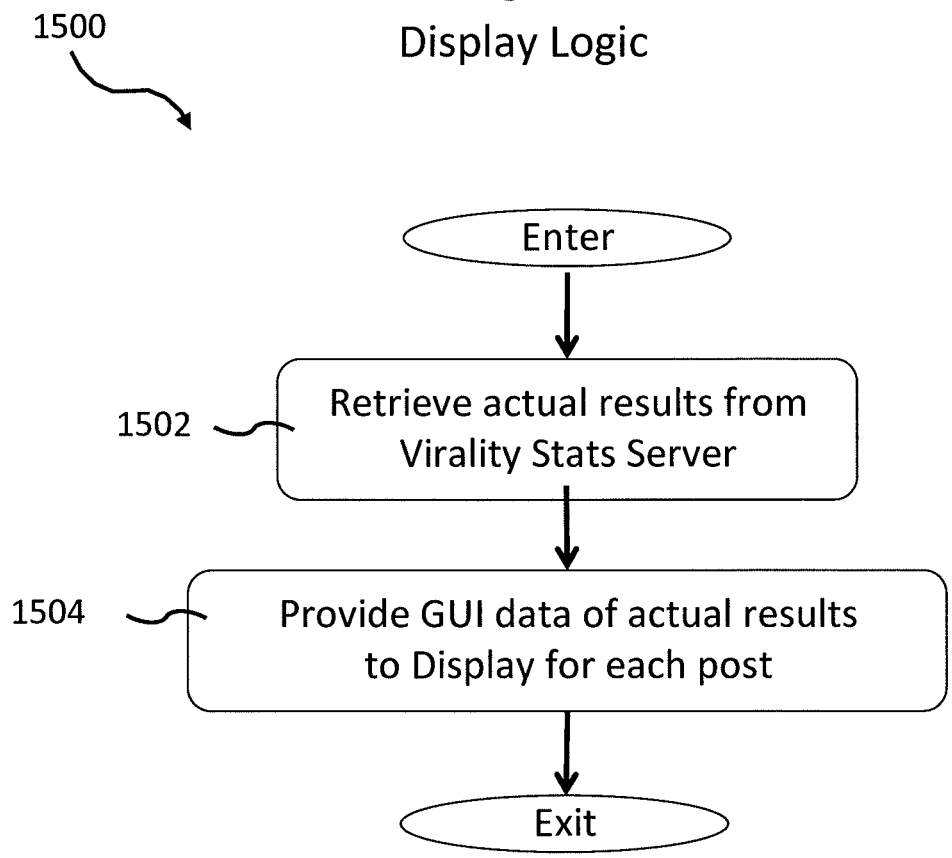
FIG. 15 is a flow diagram of another one of the components of FIG. 2, in accordance with embodiments of the present disclosure.

Referring to FIG. 14, a flow diagram 1400 illustrates one embodiment of a process or logic 1400 for implementing a model update portion of the Virality Prediction & Update Logic 224 (FIG. 2). The process 1400 begins at a block 1402, which waits (or delays further execution) until the model Prediction Time (Tp) has passed, before continuing with the process 1400 for a given post. As discussed herein, the Prediction Time (Tp) is the time at which the prediction of the models described herein is intended to be collected on a given post to perform a reliable prediction. Other prediction times (Tp) may be used if desired, provided it provides the functions and performance described herein. The process 1400 may run only once for each post to provide the desired updates to the prediction models at time Tp, or it may be run continuously after Tp to obtain more information about how each post performed (was disseminated) on social media and further update the predictive models accordingly. Accordingly, the model update logic 1400 is performed after the prediction model process 1200 is completed for a given post.

Next, a block 1404 retrieves actual results for a given post in the Virality Stats Table 600 (FIG. 6), from the Virality Stats Server 36, and in the Model Features Table 900 (FIG. 9), from the Model Features Server 38.

Next, block 1406 updates the model parameters for each predictive models, including the wait time (Tw) and prediction time (Tp), as appropriate. In particular, the block 1406 may correlate the data shown in the Model Features Table 900 for a given post (e.g., P1-1, column 906), and to the actual response data shown in the Virality Stats Table 600 for the corresponding post (e.g., P1-1, columns 604-622), to identify correlation trends and areas to improve the results of the predictability models using techniques for updating machine learning software models.

For example, if the prediction model of FIG. 12 predicted that the shares growth would be between 2× and 3×, from the end of the wait time Tx (when the model is run) to the prediction time Tp, and the actual shares growth was 4×, as shown by the shares data in the Virality Stats Table 600 (column 604, FIG. 6) and the other information in the table 600, then the logic of block 1406 will analyze values of the factors of the Model Features Table factors (910-918) for a given post (e.g., P1-1, column 906), and determine which factors (if any) should be given more (or less) weight in the predictive model to improve the accuracy of the model. Such factor adjustment may be done for each post and the results averaged (or otherwise combined) into a common adjustment for the predictive models.

In another example, if the Virality Stats data shows it would be better to wait 1.5 hrs instead of 1 hr before performing the models, e.g., if important trends in the virality score or in the "shares" data at around ex-post 1.5 hours that the output of the prediction models did not reflect, then the block 1406 may increase the Wait Time (Tw) from 1 hour to 1.5 hours before the prediction logic runs the predictive models. Similarly, if the Virality Stats data shows that the prediction results of the prediction models would have been more accurate if the prediction time (Tp) was set to 8 hrs instead of 6 hrs, the logic in block 1406 may increase the prediction time (Tp) to 8 hrs.

Next, block 1408 updates the "auto-viral" rules (or triggers) based on the actual results for that post. For example, if a sports name or event is identified in a post by the Model Features Logic and that post goes viral (as determined by the results in the Virality Stats table 600), the block 1408 checks if that name or event is in the auto-viral rules database. If not, the block 1408 will update the database to add that name or event. The same applies to the other content discussed herein above for the "auto-viral" triggers, including content created around final sports games for a season or important sports matches, controversies in sports, attrition of high profile athlete, death of a well-known athlete or sports figure, and the like. Other content may be used as auto-viral triggers if desired.

Figure 16A:
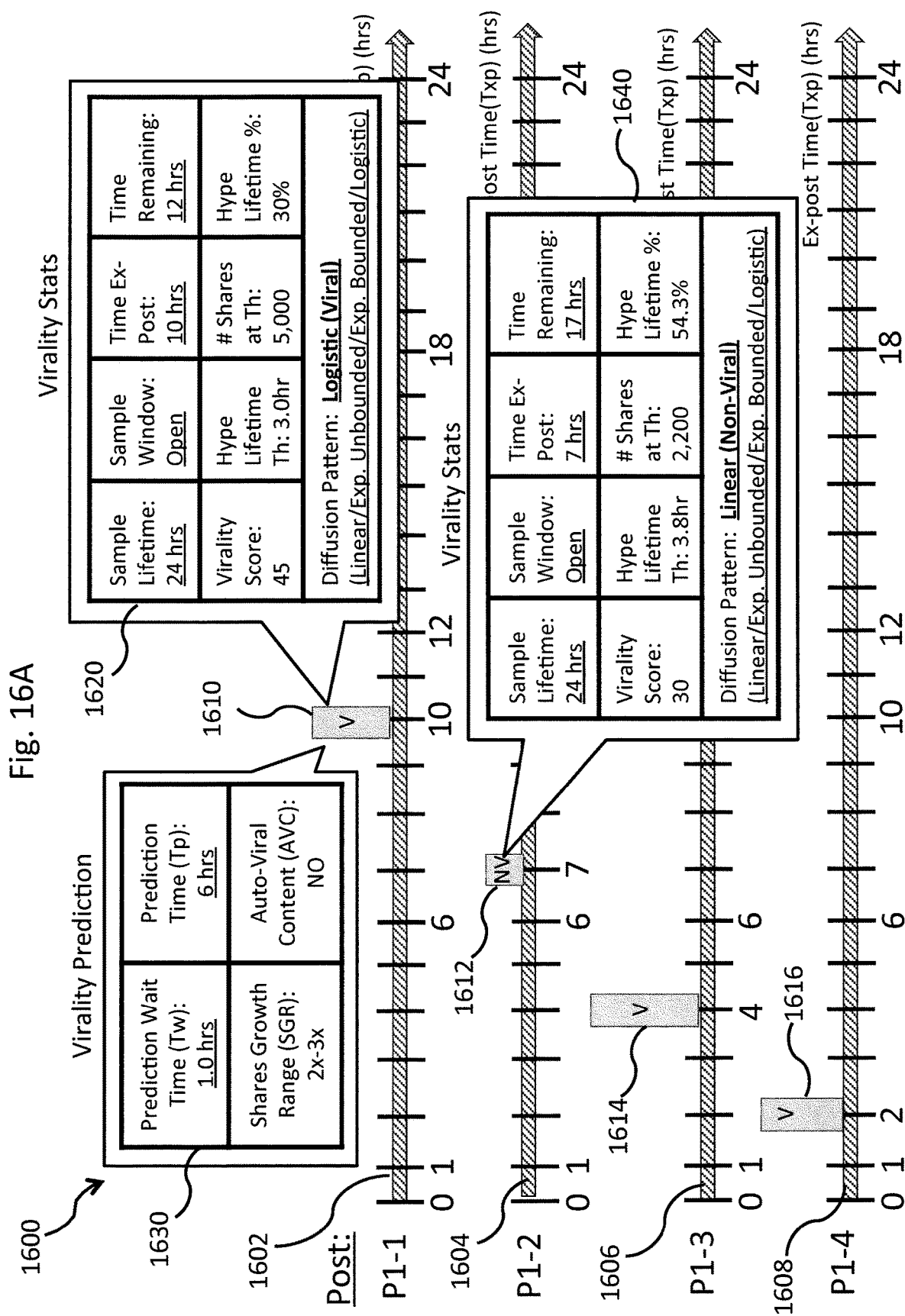
FIG. 16A is a screen illustration of a graphical user interface showing virality data for a plurality of posts, in accordance with embodiments of the present disclosure.
Figure 16B:
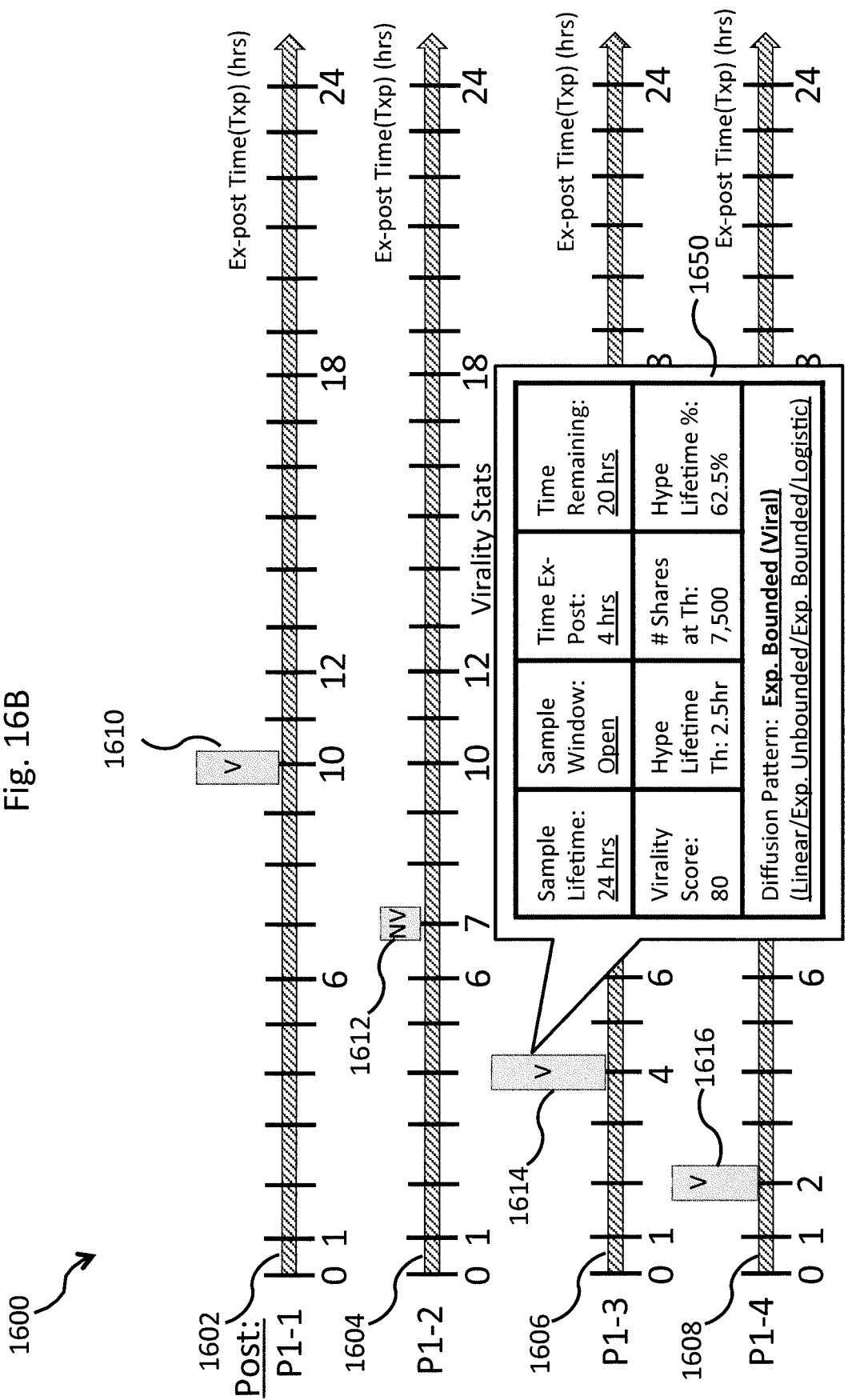
FIG. 16B is a screen illustration of the graphical user interface of FIG. 16A showing virality data for certain posts, in accordance with embodiments of the present disclosure.
Figure 16C:
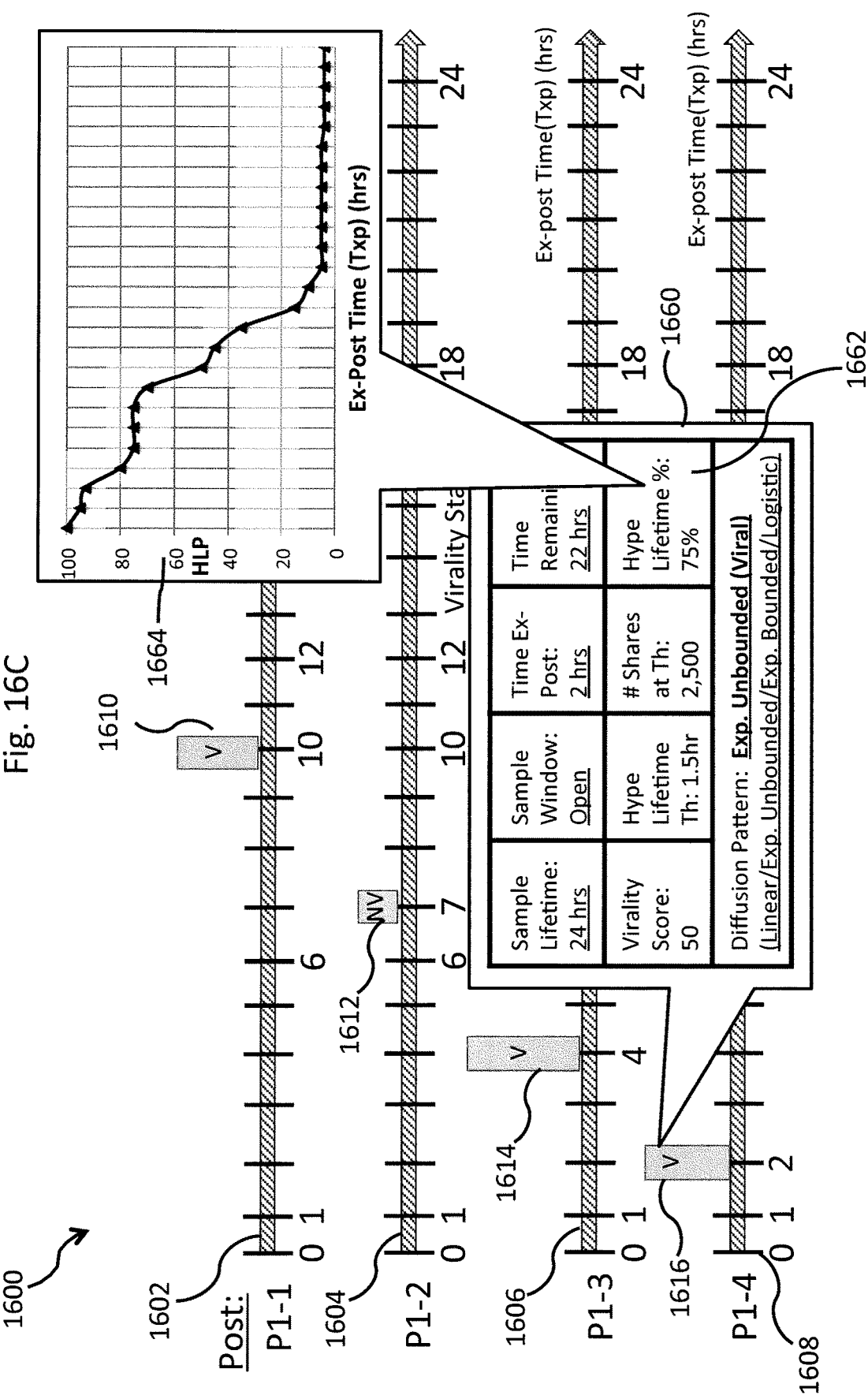
FIG. 16C is a screen illustration of the graphical user interface of FIG. 16A showing virality data for certain posts, in accordance with embodiments of the present disclosure.

Referring to FIGS. 15 and 16A-16C, a flow diagram 1500 illustrates one embodiment of a process or logic 1500 for implementing a portion of the Display Logic 226 (FIG. 2). The process 1500 begins at a block 1502, which retrieves actual results for a given post from the Virality Stats Table 600 (FIG. 6) and the Virality Prediction Table 1300 (FIG. 13), from the Virality Stats Server 36. Next, a block 1504 provides GUI data indicative of the actual results for each post to the display 18 (FIG. 2), from the actual results, as shown in FIGS. 16A-16C, as discussed hereinafter.

Referring to FIGS. 16A-16C, a GUI 1600, or virality GUI, showing a visualization of the virality results is shown. More specifically, each of the posts (P1-1 to P1-4) may be shown on ex-post timelines 1602-1608, respectively, with virality bars (or virality graphic) 1610-1616, indicative of virality status of the posts 1602-1604. The height of each of the virality bars 1610-1616 is indicative of the value of the Virality Score at that point in time. If the vertical bar has a "V" inside the bar 1610-1616, it means the diffusion pattern of the post was indicative of a viral diffusion (e.g., Exponential Unbounded, Exponential Bounded, or Logistic), if a "NV" is inside the bar 1610-1616, it means the diffusion pattern of the post was indicative of a non-viral diffusion (e.g., Linear). The colors, shapes, and sizes of the virality bars or graphics 1610-1616 may be determined by a system default or by user settings. The term "virality bars" or "virality graphic" means any graphic, graphical representation, or image, having any shape, size, orientation, dimensions, or color, that is indicative of any of the virality parameters discussed herein.

If the user taps-on/touches (for touch screen displays), or clicks-on, selects, or otherwise interacts with, the virality graphic, e.g., the graphic 1610, a pop-up window 1620 may appear showing the results from the Virality Stats table 600 for that post (P1-1), such as Sample Lifetime (total sample time, e.g., 24 hrs), Sample Window (whether the sample window is currently open or closed, e.g., open), Ex-Post Time Txp (how long ago was the posting, e.g., 10 hrs for post P1-1), Time Remaining in the sample window (Sample Lifetime minus Ex-Post Time), e.g., 12 hrs, Virality Score (e.g., 45), Hype Lifetime (Th) (e.g., 3.0 hrs), # Shares at Th (e.g., 5,000), Hype Lifetime % (e.g., 30%), and Diffusion Pattern (e.g., Logistic (viral)). Other Virality Stats data may be displayed in the window 1620 from the Virality Stats table 600, or other Virality Stats information discussed herein, if desired.

Also, if the user taps-on/touches (for touch screen displays), the virality graphic twice in rapid succession (or double clicks on it), a pop-up window 1630 may appear showing the results from the Virality Prediction table 600 for that post (P1-1), such as Prediction Wait Time (Tw) (e.g., 1.0 hrs), Prediction Time (Tp) (e.g., 6 hrs), Shares Growth Range (SGR), e.g., 2×-3×, Auto-Viral Content (AVC), e.g., NO. Other Virality Prediction data may be displayed in the window 1630, such as data shown in the Model Features table 900 (FIG. 9), or other Virality information discussed herein, if desired.

Similarly, if the user taps-on/touches (for touch screen displays), or clicks-on or otherwise interacts with, the graphic 1612, a pop-up window 1640 may appear showing the results from the Virality Stats table 600 for that post (P1-2), such as Sample Lifetime (total sample time, e.g., 24 hrs), Sample Window (e.g., open), Ex-Post Time Txp (e.g., 7 hrs), Time Remaining in the sample window (e.g., 17 hrs), Virality Score (e.g., 30), Hype Lifetime (Th) (e.g., 3.8 hrs), # Shares at Th (e.g., 2,200), Hype Lifetime % (e.g., 54.3%), and Diffusion Pattern (e.g., Linear (Non-Viral)). Other Virality Stats data may be displayed in the window 1640 from the Virality Stats table 600, or other Virality Stats information discussed herein, if desired.

Referring to FIG. 16B, similarly, if the user taps-on/touches (for touch screen displays), or clicks-on, selects, or otherwise interacts with, the virality graphic 1614, a pop-up window (or graphic) 1650 may appear showing the results from the Virality Stats table 600 for that post (P1-3), such as Sample Lifetime (e.g., 24 hrs), Sample Window (e.g., open), Ex-Post Time Txp (e.g., 4 hrs), Time Remaining (e.g., 20 hrs), Virality Score (e.g., 80), Hype Lifetime (Th) (e.g., 2.5 hrs), # Shares at Th (e.g., 7,500), Hype Lifetime % (e.g., 62.5%), and Diffusion Pattern (e.g., Exp. Bounded (viral)). Other Virality Stats data may be displayed in the window 1650 from the Virality Stats table 600, or other Virality Stats information discussed herein, if desired.

Referring to FIG. 16C, similarly, if the user taps-on/touches (for touch screen displays), or clicks on, selects, or otherwise interacts with, the graphic 1618, a pop-up window (or graphic) 1630 may appear showing the results from the Virality Stats table 600 for that post (P1-4), such as Sample Lifetime (e.g., 24 hrs), Sample Window (e.g., open), Ex-Post Time Txp (e.g., 2 hrs), Time Remaining in the sample window (e.g., 22 hrs), Virality Score (e.g., 50), Hype Lifetime ($T_h$) (e.g., 1.5 hrs), # Shares at $T_h$ (e.g., 2,500), Hype Lifetime % (e.g., 75%), and Diffusion Pattern (e.g., Exp. Unbounded (Viral)). In addition, if the user taps-on/touches (for touch screen displays), or clicks on, selects, or otherwise interacts with, an HLP section 1662 of the Virality status pop-up graphic 1660, another pop-up window (or graphic) 1664 may appear showing an HLP curve with the HLP values for that post from the beginning of the post to the current ex-post time (Txp). Other Virality Stats data may be displayed in the window 1660 from the Virality Stats table 600, or other Virality Stats information discussed herein, if desired. The format of display may be based on default settings of the system 10 or based on input commands and settings set by the user.

The format of display, pop-up windows, and virality graphics described herein may be based on default settings of the system 10 or based on input commands and settings set by the user.

The user computer 12 (FIG. 1) may be any computer-based device, capable of performing the functions described herein. The user computer 12 may be a desktop or laptop computer, a smartphone, a tablet, a smart TV, or the like. In some embodiments, the main Virality Processing Logic 14 on the user computer and a separate software application (e.g., Virality App) loaded on separate mobile user device, e.g., smartphone, laptop, tablet, or the like, which receives the results from the user computer 12 and provides desired graphic user interface or GUI or visualization (as described herein) on the local mobile device.

As discussed herein, the user computer 12 may communicate with one or more separate computer servers via the network 60 such as the Virality Stats Server 36, Model Features Server 38, Virality Rules Server 40, or the Sentiment & Topic Server 42. The servers 36-42 may be any type of computer server with the necessary software or hardware (including storage capability) for performing the functions described herein. Also, the servers 36-42 (or the functions performed thereby) may be located, individually or collectively, in a separate server on the network 60, or may be located, in whole or in part, within one (or more) of the User Computers 12 on the network 60. In addition, the User Computer(s) 12, the Social Media Server(s) 30 and the Posting Computer 20 may each communicate via the network 60 with any other network-enabled devices or logics as needed, to provide the functions described herein.

Portions of the present disclosure may be implemented (or distributed) outside the user computer 12 (FIG. 1), as shown by the virality processing logics 38. For example, the virality processing logic 14 for some or all social media accounts may be performed on the user computer 12, or, in some embodiments, the virality processing logic 14 for one or more of the social media accounts may be distributed or run-in-parallel by separate computers or processors or processing centers, or clusters (e.g., multiple CPU cores operating in parallel), such as may be provided by Amazon® web services or the like.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for determining, continuously in real-time, without using a social network structure, at least one metric indicative of dissemination of social media content, comprising:
   receiving shares data over time, forming a shares time series using only shares data, the shares time series indicative of how the content is being shared on social media;
   fitting a plurality of curve fit models to the shares time series;
   identifying a best curve fit model from the plurality of curve fit models that best fits the shares time series;
   calculating a virality score metric, indicative of the rate of dissemination of the social media content, using the best curve fit model;
   determining a dissemination type comprising one of viral dissemination and non-viral dissemination, using the best curve fit model;
   wherein the plurality of curve fit models comprises at least one parametric curve with an increasing gradient, followed by a decreasing gradient, and an inflection point there-between;
   calculating a hype lifetime (Th) using the inflection point, as the time at which the inflection point occurs;
   calculating a hype lifetime percentage as a percentage of ex-post time (Txp) that the shares spent at the inflection point by the equation: $(T_h/ T_{xp})*100$; and
   wherein the receiving, fitting, identifying, and calculating are performed continuously in real-time.

2. The method of claim 1, wherein the plurality of curve fit models comprises at least one of: an exponential bounded curve and a logistic curve.

3. The method of claim 1, wherein the plurality of curve fit models comprises at least one of: an exponential curve and a linear curve.

4. The method of claim 1, wherein the step of identifying the best curve fit model comprises using a Bayesian Information Criteria.

5. The method of claim 1, wherein the shares data comprises at least one of: shares, likes, re-tweets, comments, favorites, and bookmarks.

6. The method of claim 1, further comprising calculating a number of shares at the hype lifetime using the inflection point.

7. The method of claim 6, further comprising providing an alert when the hype lifetime percentage reaches at least one of: a predetermined threshold or a predetermined rate of change.

8. The method of claim 1, wherein the steps of receiving, fitting, identifying, and calculating are continuously performed in real-time during a predetermined sample lifetime, at a predetermined shares sample interval.

9. The method of claim 1, further comprising providing a graphical user interface showing an ex-post timeline and at least one of: a virality graphic, virality stats, and virality prediction.

10. The method of claim 1, further comprising predicting a shares growth range at a future prediction time, using at least one ensemble-based classification model, based on feature data obtained at a wait time after the content was posted to social media.

11. The method of claim 10, wherein the feature data comprises at least one of: virality and statistics-based features, post/article content-based features, comment-based features, external-based features, and account-based features.

12. The method of claim 10, wherein the feature data comprises at least one of: the virality score, a hype, a diffusion pattern, diversity/generality of topics, and similarity of content with the most recent few posts contents.

13. The method of claim 12, wherein the diversity or generality of topics is determined by calculating a distance between topics in the content.

14. The method of claim 10, wherein the step of predicting is only performed when the topic of the content fails to meet any predetermined "auto-viral" content trigger rules.

15. A method of predicting, continuously in real-time, future dissemination of social media content, comprising:

Performing, continuously in real-time, an ensemble-based classification, using feature data obtained at a wait time (Tw) after the content was posted to social media, the feature data comprising at least one of: a virality score, a hype, a diffusion pattern, diversity/generality of topics, and a similarity of content with most recent few posts contents;

the classification iteratively increasing a share growth factor to determine a shares growth range at a future prediction time (Tp), which is indicative of the future dissemination of the content; and wherein the increasing the share growth factor comprises increasing the share growth factor by a predetermined unique multiplier value for each iteration pass until a predicted result changes and wherein the ensemble-based classification is performed by an ensemble of predictive classifier models, each classifier model having the unique multiplier associated therewith.

16. The method of claim 15, wherein the feature data comprise at least one of: virality and statistics-based features, post or article content-based features, comment-based features, external-based features, and account-based features.

17. The method of claim 15, wherein the diversity/generality of topics is determined by calculating a distance between topics in the content.

18. The method of claim 15, wherein the step of predicting is not performed when the topic of the content meets predetermined "auto-viral" content trigger rules.

19. The method of claim 15, further comprising providing a graphical user interface showing an ex-post timeline and at least one of: a virality graphic, virality stats, and virality prediction.

20. The method of claim 15, wherein the unique multiplier comprises at least one of: 2×, 3×, 4×, 5×, and 6×, and each classifier model predicting whether the number of shares for a given social media post will increase by the associated multiplier value at the prediction time (Tp).

* * * * *